(12) United States Patent
Os et al.

(10) Patent No.: US 9,319,402 B2
(45) Date of Patent: Apr. 19, 2016

(54) DIGITAL HANDSHAKE FOR AUTHENTICATION OF DEVICES

(71) Applicant: Apple Inc., Cupertino, CA (US)

(72) Inventors: Marcel Van Os, San Francisco, CA (US); Caroline Cranfill, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/483,081

(22) Filed: Sep. 10, 2014

(65) Prior Publication Data

US 2015/0058952 A1    Feb. 26, 2015

Related U.S. Application Data

(63) Continuation of application No. 12/788,071, filed on May 26, 2010, now Pat. No. 8,856,901.

(51) Int. Cl.
*G06F 21/00* (2013.01)
*H04L 29/06* (2006.01)
(Continued)

(52) U.S. Cl.
CPC .......... *H04L 63/0853* (2013.01); *G06F 21/445* (2013.01); *G06Q 30/06* (2013.01); *H04L 9/0827* (2013.01); *H04L 9/0841* (2013.01); *H04L 63/0876* (2013.01); *H04L 63/10* (2013.01)

(58) Field of Classification Search
CPC ........ G06F 21/30; G06F 21/35; G06F 21/606
USPC ........................................................ 726/7
See application file for complete search history.

(56) References Cited

U.S. PATENT DOCUMENTS

2003/0050802 A1 *   3/2003   Jay et al. ..................... 705/3
2004/0223616 A1 *   11/2004  Kocarev .............. H04L 9/001
                                                        380/263
(Continued)

FOREIGN PATENT DOCUMENTS

WO    WO 2008040949 A2 *    4/2008

OTHER PUBLICATIONS

McCune, J.M.; Perrig, A.; Reiter, M.K.;, "Seeing-is-believing: using camera phones for human-verifiable authentication," Security and Privacy, 2005 IEEE Symposium on , vol., no., pp. 110-124, May 8-11, 2005 (hereinafter 'McCune').*

(Continued)

*Primary Examiner* — Syed Zaidi
(74) *Attorney, Agent, or Firm* — Downey Brand LLP

(57) ABSTRACT

This is directed to a digital handshake for establishing a secure communications path between two electronic devices. Each device can capture an image of the other device using a camera (e.g., a front facing camera or a back facing camera) and extract, from the captured image, a key or seed associated with the other device. For example, each device can display a seed to be identified from an image taken by the other device. Using the extracted keys or seeds, each device can generate, using a same process, an identical digital handshake key. The digital handshake key can then be used to define a secure communications path between the two devices and share information securely. In some embodiments, a digital handshake key can be shared among several devices to create a multi-device secure communications path. Once a communications path has been established, the devices in the path can be identified and authenticated from the digital handshake key to receive access to secured goods, services or information.

20 Claims, 15 Drawing Sheets

(51) Int. Cl.
*G06F 21/44* (2013.01)
*G06Q 30/06* (2012.01)
*H04L 9/08* (2006.01)

(56) References Cited

U.S. PATENT DOCUMENTS

2005/0113969 A1* 5/2005 Spano et al. ............. 700/237
2007/0133846 A1* 6/2007 Andersson ............... 382/124
2009/0171691 A1* 7/2009 Lubarski et al. ............ 705/1

OTHER PUBLICATIONS

Saxena, N.; Ekberg, J.-E.; Kostiainen, K.; Asokan, N.; , "Secure device pairing based on a visual channel," Security and Privacy, 2006 IEEE Symposium on , vol., no., pp. 6 pp. 313, May 21-24, 2006.*
Kento Miyaoku, Suguru Higashino, and Yoshinobu Tonomura. 2004. C-blink: a hue-difference-based light signal marker for large screen interaction via any mobile terminal. In Proceedings of the 17th annual ACM symposium on User interface software and technology (UIST '04). ACM, New York, NY, USA.*
Rescorla, Eric. "Diffie-Hellman key agreement method." (1999).*

* cited by examiner

DIGITAL HANDSHAKE FOR AUTHENTICATION OF DEVICES

CROSS-REFERENCE TO RELATED APPLICATIONS

This application is a continuation of U.S. application Ser. No. 12/788,071 filed May 26, 2010 entitled "DIGITAL HANDSHAKE FOR AUTHENTICATION OF DEVICES," the contents of which are incorporated herein by reference in their entirety for all purposes.

FIELD

This is directed to creating a secure short range communications path between electronic devices. In particular, this is directed to using an interaction between two devices to create a secure communications network.

BACKGROUND

As portable electronic devices increasingly have more functionality and become more available, more users may own such devices. The devices can be used to store any suitable information, including for example, media, application data (e.g., contacts or calendar events), text and number documents, or combinations of these. In some cases, the devices can operate one or more applications that can provide particular functionality to the user of the device. For example, applications can relate to one or more of games, e-books, business, education, finance, healthcare, lifestyle, navigation, news, productivity, reference, social networking, sports, utilities, travel, and weather. Using the electronic devices, users can generate or access information (e.g., data or application displays) that a user may wish to share with others.

Users can share information using several different approaches. In some cases, a user can show an electronic device display to another user, so that the other user can copy off of the display. This approach, however, fails to take advantage of the fact that the other user may have an electronic device as well. In some other cases, a user can send an email, text or media message, or other message over a communications link, where the information to share is incorporated in the message. The receiving user can then view the information from communication, and copy and paste the information as desired.

In some cases, two electronic devices can instead or in addition form a direct communications path. For example, two electronic devices can share a key over a communications network (e.g., a passkey in a Bluetooth® network), and establish a secure communications path. As another example, two electronic devices can detect a same or similar accelerometer output, and use the accelerometer output as a key to secure a communications path. These approaches, however, can require a user to generate or enter a key, or require a particular component in the device (e.g., an accelerometer or other sensor).

Once two electronic devices share a common communications path, the electronic devices can share different data. For example, the devices can share information on an application level (e.g., share application data between two instances of an application operating on different devices). In particular, photos, contacts, or calendar events can be shared by an application.

SUMMARY

This is directed to systems, methods and computer-readable media for establishing a communications path between two devices using a digital handshake.

To establish a secure communications path, two devices can share seeds or keys to generate a single digital handshake key. The devices can share the keys using any suitable approach, including for example providing the keys in a manner that an image captured by each device can include the other device's key. For example, devices can be placed opposite each other (e.g., face-to-face, face-to-back, or back-to-back) such that a camera of the device includes the other device in its field of view.

Each device can provide a key using any suitable approach. For example, each device can display a key (e.g., a dynamic key) on a display. As another example, each device can include a key embedded as part of the device housing. Each device can apply a process to the device-provided key and to the captured key such that both devices generate the same digital handshake key. In some embodiments, one or both devices can identify a specific process, or specific parameters or attributes to include as part of the process. In some cases, the process can be selected based on options selected by one or both devices for the communications path.

In some cases, several devices can establish a single communications path. For example, several devices can share keys or seeds that can be used to generate a communications path. Alternatively, the seeds or keys of a subset of devices can be used to generate the digital handshake key used by all of the devices. For example, a communications path can initially be established using two devices, and additional devices can then connect to the communications path using the initially generated digital handshake key.

If an electronic device detects several distinct electronic devices in a captured image, the electronic device can process the image to determine with which of the detected electronic devices to establish a communications path. For example, the electronic device can determine the orientation of the other devices relative to the electronic device. In particular, the electronic device can determine which portion of the other devices faces a camera of the electronic device. Alternatively, the electronic device can determine which of the other devices has a camera that captures it in the camera field of view. As another example, the electronic device can determine the distance of each of the other devices. As still another example, the electronic device can determine which of the other devices are displaying content that corresponds to a digital handshake mode (e.g., which device provides a display having a key or seed).

Once at least two electronic devices have established a communications path using the digital handshake, the devices can share any suitable information. For example, the electronic devices can share information that is specific to an application operating on one of the devices (e.g., social network operations available from a social network application). As another example, the electronic devices can share information independent of a particular application operating on the devices (e.g., share contact information or calendar events). In some embodiments, the devices can share some or all of the information displayed by one of the devices (e.g., share some or all of a display).

In some embodiments, the digital handshake can be used as an authentication system. For example, a first electronic device can establish a communications path with a second electronic device using a digital handshake, where the particular digital handshake key of the digital handshake identifies each of the participants. Once a device has been identified, it may access secured information. In some cases, the digital handshake can be used to identify a user wishing to acquire goods or services. For example, a digital handshake can be used to purchase or retrieve prescription medicine for a particular user, or to enable the release of funds or of previously purchased or stored goods.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This is directed to creating a secure communications path between electronic devices using a digital handshake. In addition, this is directed to a framework for sharing information between devices over a communications path provided by the digital handshake.

Figure 1:
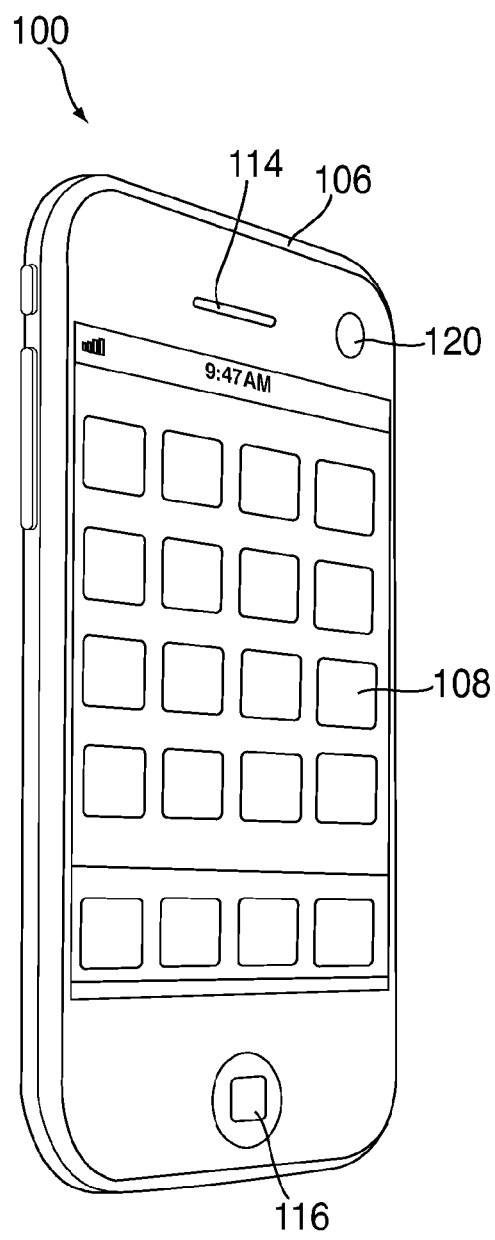
FIG. 1 is a perspective view of an illustrative electronic device participating in a digital handshake operation in accordance with one embodiment of the invention.
Figure 2:
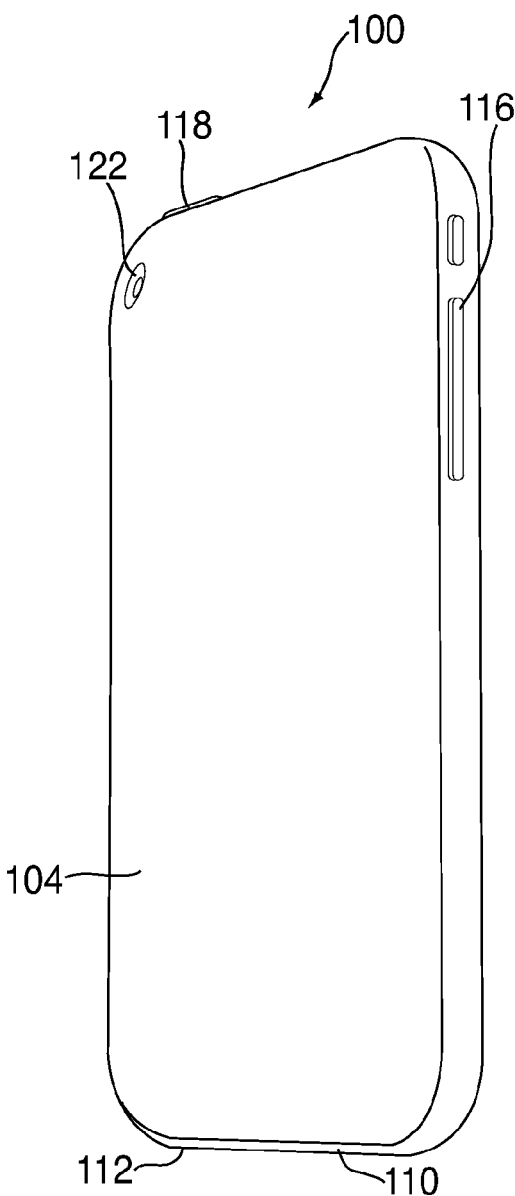
FIG. 2 is a perspective view of a back surface of the electronic device of FIG. 1 in accordance with one embodiment of the invention.

FIG. 1 is a perspective view of an illustrative electronic device participating in a digital handshake operation in accordance with one embodiment of the invention. FIG. 2 is a perspective view of a back surface of the electronic device of FIG. 1 in accordance with one embodiment of the invention. Electronic device 100 can include any suitable type of electronic device operative to display information to a user. For example, electronic device 100 can include a media player such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a music recorder, a video recorder, a gaming device, a camera, radios, medical equipment, and any other portable electronic device having a display from which a user can select a portion of displayed objects.

Electronic device 100 can include an enclosure that is constructed from housing 104 and bezel 106. Display 108 can be assembled in the electronic device between housing 104 and bezel 106, so that display 108 can be constrained by the bezel. Display 108 can provide any suitable information, including for example system information, application information, or combinations of these. In one implementation, display 108 can provide information related to a handshake protocol.

Electronic device 100 can include any suitable interface for interacting with the device. For example, electronic device 100 can include connector port 110, speakers or audio output interfaces 112 and 114, and buttons 116 and 118. Electronic device 100 can include any suitable combination of interfaces, including interfaces for providing inputs to the device, or interfaces for receiving outputs from the device. In some embodiments, a single interface can simultaneously be used to provide inputs and to receive inputs from a user. For example, electronic device 100 can include a touch display through which a user can interact with the device (e.g., a capacitive touch sensor).

The electronic device can include any suitable component within the device enclosure. For example, the electronic device can include one or more circuit boards with integrated circuit components, an antenna, radio frequency circuitry, or other communications circuitry, a speaker, a microphone, storage (e.g., solid state storage or a hard drive) one or more processors, or other components. Further details regarding internal components are discussed below in connection with FIG. 3.

In some embodiments, electronic device 100 can include one or more sensors for capturing or detecting attributes of the environment in which the device is placed. For example, the electronic device can include one or more accelerometers or other motion detection components. As another example, the electronic device can include one or more cameras for capturing images of the device environment. In particular, electronic device 100 can include front facing camera 120 and rear facing camera 122.

Figure 3:
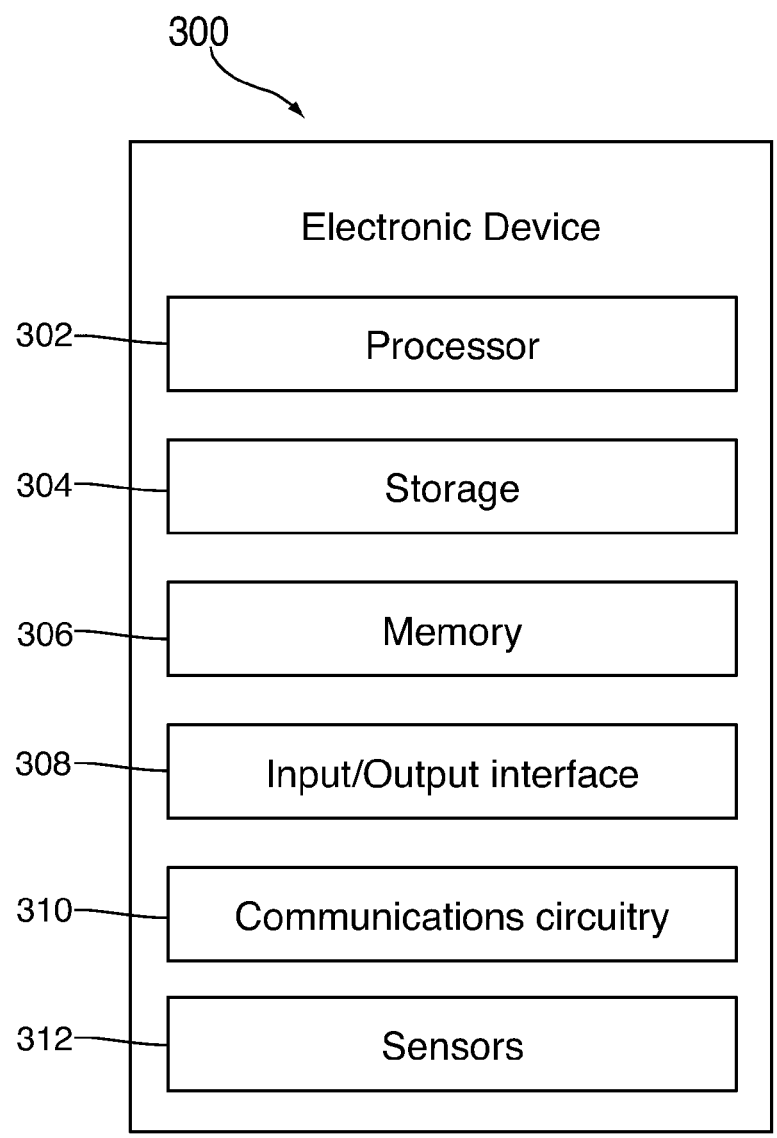
FIG. 3 is a block diagram of an electronic device in accordance with one embodiment of the invention.

FIG. 3 is a block diagram of an electronic device in accordance with one embodiment of the invention. Electronic device 300 can include a processor 302 or control circuitry, storage 304, memory 306, input/output interface 308, communications circuitry 310 and sensors 312, as typically found in an electronic device of the type of electronic device 300, and operative to enable any of the uses expected from an electronic device of the type of electronic device 300 (e.g., connect to a host device for power or data transfers). In some embodiments, one or more of electronic device components can be combined or omitted (e.g., combine storage 304 and memory 306), electronic device 300 can include other components not combined or included in those shown in FIG. 3 (e.g., communications circuitry or positioning circuitry), or electronic device 300 can include several instances of the components shown in FIG. 3. For the sake of simplicity, only one of each of the components is shown in FIG. 3.

Control circuitry 302 can include any processing circuitry or processor operative to control the operations and performance of electronic device 300. Storage 304 can include, for example, one or more storage mediums including a harddrive, solid state drive, flash memory, permanent memory such as ROM, any other suitable type of storage component, or any combination thereof. Memory 306 can include cache memory, semi-permanent memory such as RAM, and/or one or more different types of memory used for temporarily storing data. In some embodiments, memory 306 and storage 304 can be combined as a single storage medium. Input/output circuitry 308 can be operative to convert (and encode/decode, if necessary) analog signals and other signals into digital data.

Input/output interface 308 can convert (and encode/decode, if necessary) analog signals and other signals into digital data. For example, input/output interface 308 may receive and convert physical contact inputs (e.g., from a multi-touch screen or a button press), physical movements (e.g., from a mouse or sensor), analog audio signals (e.g., from a microphone), or any other input provided by a user. Although input/output interface 308 is illustrated in FIG. 3 as a single component of electronic device 300, several instances of input/output interface 308 can be included in electronic device 300.

Electronic device 300 can include any suitable mechanism, circuitry or component for allowing a user to provide inputs to input/output interface 308. For example, electronic device 300 may include a button, keypad, dial, a click wheel, or a touch interface (e.g., a capacitive touch screen), or combination of these. In some embodiments, input/output interface 308 can instead or in addition include circuitry, software, firmware, or other components for detecting and processing voice inputs or other audio inputs. In some cases, input/output interface 308 can be operative to detect and process inputs received from gestures of the device (e.g., inputs detected from movements of the device, such as shaking, twisting or spinning).

Electronic device 300 can include specialized output interface associated with output signals such as, for example, one or more audio or visual outputs. An audio output may include one or more speakers (e.g., mono or stereo speakers) built into electronic device 300, or an audio component that is remotely coupled to electronic device 300 (e.g., a headset, headphones or earbuds that may be coupled to communications device with a wire or wirelessly). A visual output can include display circuitry (e.g., a screen or projection system) for providing a display visible to the user. For example, the display circuitry can include a screen (e.g., an LCD screen) that is incorporated in electronic device 300, a movable display or a projecting system for providing a display of content on a surface remote from electronic device 300 (e.g., a video projector), or combinations of these. In some embodiments, input/output interface 308 can include a coder/decoder (Codec) to convert digital media data into analog signals such as, for example, video Codecs, audio Codecs, or any other suitable type of Codec.

Communications circuitry 310 may be operative to communicate with other devices or with one or more servers using any suitable communications protocol. Electronic device 300 may include one more instances of communications circuitry for simultaneously performing several communications operations using different communications networks. For example, communications circuitry may support Wi-Fi (e.g., a 802.11 protocol), Ethernet, Bluetooth™ (which is a trademark owned by Bluetooth Sig, Inc.), radio frequency systems, cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, FTP, RTP, RTSP, SSH, Voice over IP (VOIP), any other communications protocol, or any combination thereof. In some embodiments, communications circuitry 310 may include one or more communications ports operative to provide a wired communications link between electronic device 300 and a host device. For example, a portable electronic device may include one or more connectors (e.g., 30 pin connectors or USB connectors) operative to receive a cable coupling the portable electronic device to a host computer. Using software on the host computer (e.g. iTunes available from Apple Inc.), the portable electronic device may communicate with the host computer.

Sensors 312 can include any suitable sensor or sensor array for detecting or capturing attributes of the device environment. For example, sensors 312 can include one or more sensors integrated into a device, or coupled to the device via a remote interface (e.g., providing an output describing the environment via a wired or wireless connection). Sensors 312 can include any suitable type of sensor, including for example a camera, microphone, motion sensing component, positioning circuitry, physiological sensing component, thermometer, hygrometer, proximity sensor, IR sensor, magnetometer, or any other type of sensor for detecting characteristics of a user or of the user's environment.

The camera can be operative to detect light in an environment. In some embodiments, the camera can be operative to capture images (e.g., digital images), detect the average intensity or color of ambient light in an environment, detect visible movement in an environment (e.g., the collective movement of a crowd), or detect or capture any other light from an environment. In some embodiments, the camera can include a lens and one or more sensors that generate electrical signals. The sensors of camera can be provided on a charge-coupled device (CCD) integrated circuit, for example. The camera can include dedicated image processing circuitry for converting signals from one or more sensors to a digital format, circuitry for pre-processing digital images before they are transmitted to other circuitry within device 300, or any other suitable circuitry. Electronic device 300 can include any suitable number of cameras, including for example both front and rear facing cameras.

The microphone can be operative to detect sound in an environment, such as sound from a particular source (e.g., a person speaking), ambient sound (e.g., crowd noise), or any other particular sound. The microphone can include any suitable type of sensor for detecting sound in an environment, including for example, a dynamic microphone, condenser microphone, piezoelectric microphone, MEMS (Micro Electro Mechanical System) microphone, or any other suitable type of microphone.

The motion sensing component can be operative to detect movement of electronic device 300. In some embodiments, the motion sensing component can be sufficiently precise to detect vibrations in the device's environment, for example vibrations representative of the movement of people in the environment. Alternatively, the motion sensing component can provide an output describing the movement of the device relative to the environment (e.g., the orientation of the device, or shaking or other specific movements of the device by the user). The motion sensing component can include any suitable type of sensor for detecting the movement of device 300. For example, the motion sensing component can include one or more three-axes acceleration motion sensing components (e.g., an accelerometer) operative to detect linear acceleration in three directions (i.e., the x or left/right direction, the y or up/down direction, and the z or forward/backward direction). As another example, the motion sensing component can include one or more two-axis acceleration motion sensing components which can be operative to detect linear acceleration only along each of x or left/right and y or up/down directions (or any other pair of directions). In some embodiments, the motion sensing component can include an electrostatic capacitance (capacitance-coupling) accelerometer that is based on silicon micro-machined MEMS (Micro Electro Mechanical Systems) technology, a piezoelectric type accelerometer, a piezoresistance type accelerometer, or any other suitable accelerometer. In some embodiments, the motion sensing component can include rotational sensor (e.g., a gyroscope).

The positioning circuitry can be operative to determine the current position of electronic device 300. In some embodiments, the positioning circuitry can be operative to update the current position at any suitable rate, including at relatively high rates to provide an estimation of movement (e.g., speed and distance traveled). The positioning circuitry can include any suitable sensor for detecting the position of device 300. In some embodiments, the positioning circuitry can include a global positioning system ("GPS") receiver for accessing a GPS application function call that returns the geographic coordinates (i.e., the geographic location) of the device. The geographic coordinates can be fundamentally, alternatively, or additionally derived from any suitable trilateration or triangulation technique. For example, the device can determine its location using various measurements (e.g., signal-to-noise ratio ("SNR") or signal strength) of a network signal (e.g., a cellular telephone network signal) associated with the device. Instead or in addition, the positioning circuitry can determine the location of the device based on a wireless network or access point that is in range or a wireless network or access point to which the device is currently connected.

In some embodiments, electronic device 300 can include a bus operative to provide a data transfer path for transferring data to, from, or between processor 302, storage 304, memory 306, input/output circuitry 308, communications circuitry 310 and any other component included in the electronic device.

Two electronic devices having communications circuitry can connect to each other to form a secure communications path by which information can be shared. The electronic devices can initiate the communications path using any suitable approach. In some embodiments, two electronic devices can share an initial key used to secure a communications path over a particular communications network (e.g., over a Bluetooth or WiFi network). Once the secure path is created, the electronic devices can transfer information securely.

Figure 4:
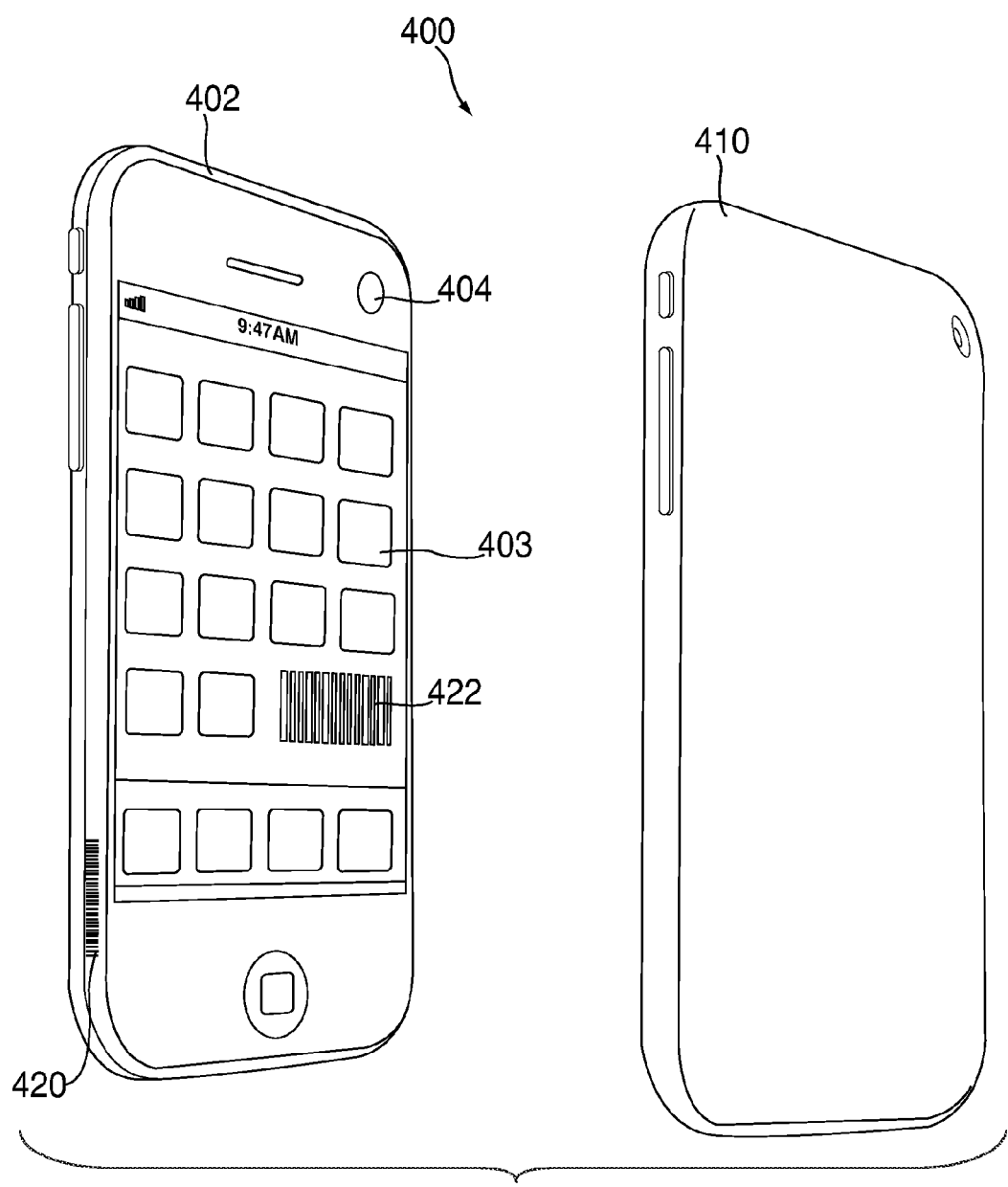
FIG. 4 is a schematic view of electronic devices positioned to initiate a digital handshake in accordance with one embodiment of the invention.

An electronic device can initiate a secure transaction using any suitable approach. In some embodiments, the electronic devices can use the information received by one or more sensors to define a shared key used by a digital handshake protocol. In particular, one or more cameras can be used to by the digital handshake protocol. In one implementation, two electronic devices can be held face to face such that the front facing cameras of each device can capture images of the front of the opposite device. FIG. 4 is a schematic view 400 of electronic devices positioned to initiate a digital handshake in accordance with one embodiment of the invention. Electronic device 402 can be placed opposite electronic device 410 such that front facing camera 404 captures the front surface of device 410, and a front facing camera of device 410 (not shown) captures front surface 403 of device 402.

The electronic devices can each direct their respective cameras to capture an image of the opposite device enclosure or display, and process the captured image to define a key for establishing a secure communications path between the devices. An electronic device can extract any suitable information from a captured image to define a key. For example, each device can include a default key used to create secure communications paths. The default key can be encoded, in a manner that only another electronic device can detect, in the device enclosure. For example, the bezel, housing, or a mask on the display (e.g., a dark region of a glass window not used to provide information) can include a key or a seed from which a key can be generated (e.g., by applying a time dependent algorithm to the seed). The key or seed can be encoded using any suitable approach, including for example as a number, image, code, or combinations of these. For example, electronic device 402 can include code 420 incorporated in the bezel.

The key or seed can be embedded in the device enclosure using any suitable approach. In some embodiments, a key can be printed, etched, adhered (e.g., an adhesive-backed film), engraved, or incorporated in the enclosure using any other approach. To ensure that the enclosure remains aesthetically pleasing, the key can be incorporated in a manner that is invisible or near invisible to a user looking at the enclosure. For example, the key can be very small. The camera can include appropriate circuitry for analyzing the image of a region of the housing that includes a key (e.g., a known region where keys are typically or always embedded). Alternatively, the camera can include a zoom for specifically concentrating on the key region of the enclosure.

As another example, the key can be provided using a material, coating, (e.g., applying a particular ink) or process that is not or is minimally visible under normal or standard lighting conditions. The camera used by the device, however, can include one or more filters, a flash or other secondary light source (e.g., an infrared or UV beam) that can reveal a hidden key. For example, a camera can include an IR light source for revealing a key printed using the IR ink. As another example, the camera can include a filter for detecting light emitted at a specific frequency corresponding to the color of the key, where the key color is slightly different from the other portions of the enclosure.

Figure 5:
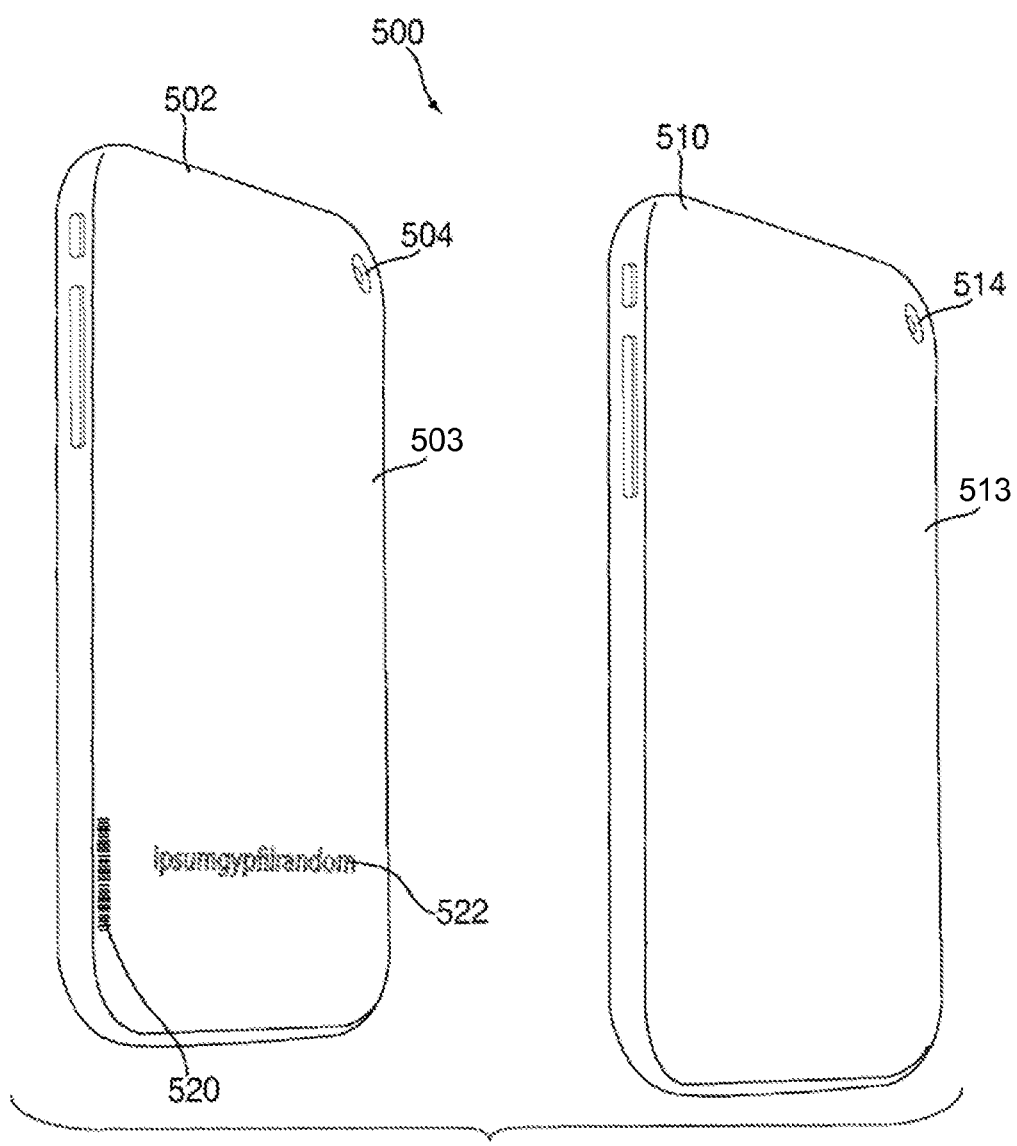
FIG. 5 is a schematic view of electronic devices positioned to initiate a digital handshake in accordance with one embodiment of the invention.

In some embodiments, the key or seed can be embedded on a portion of the enclosure that is not visible from an image of the front face of the device (e.g., the face of the device that includes the display). Instead, the key or seed can be embedded on a back surface of the enclosure (e.g., the housing), or on a side surface of the enclosure (e.g., as part of a bezel or band). To view the key or seed, a first electronic device may need to face a back surface of a second electronic device. FIG. 5 is a schematic view 500 of electronic devices positioned to initiate a digital handshake in accordance with one embodiment of the invention. Electronic device 502 can be placed opposite electronic device 510 such that a front facing camera (not shown) of electronic device 510 captures the back surface 503 of device 502, and back facing camera 504 captures a front surface of device 510 (e.g., as described above in connection with FIG. 4). Alternatively, both electronic devices 502 and 510 can be placed back to back such that the back facing cameras 504 and 514 can capture images of the back surfaces 503 and 513 of the electronic devices.

Each electronic device can include any suitable information embedded or incorporated in a back surface of the enclosure for generating a key. For example, electronic device 502 can include a code 520 embedded along a side or back surface of the device enclosure. As another example, a code or key can be incorporated in a logo or text applied to the back surface (e.g., logo 522). The code or key can include, for example, a portion of a serial number, device ID, or other identifying information. In some embodiments, an optical coating can be applied to a back surface to incorporate a key in existing text (e.g., text required by federal regulations), such that the key is only visible to a camera having an appropriate filter or light source (e.g., as described above in connection with FIG. 4).

Returning to FIG. 4, in some embodiments, the electronic device can instead or in addition provide a key, seed, or other information used to generate a secure communications path, on the display. For example, the electronic device can display a code (e.g., bar code 422), image, text, number, or other information on the device display. When the other device captures an image of the device display, the device can process the captured image to retrieve the code or key.

Figure 6:
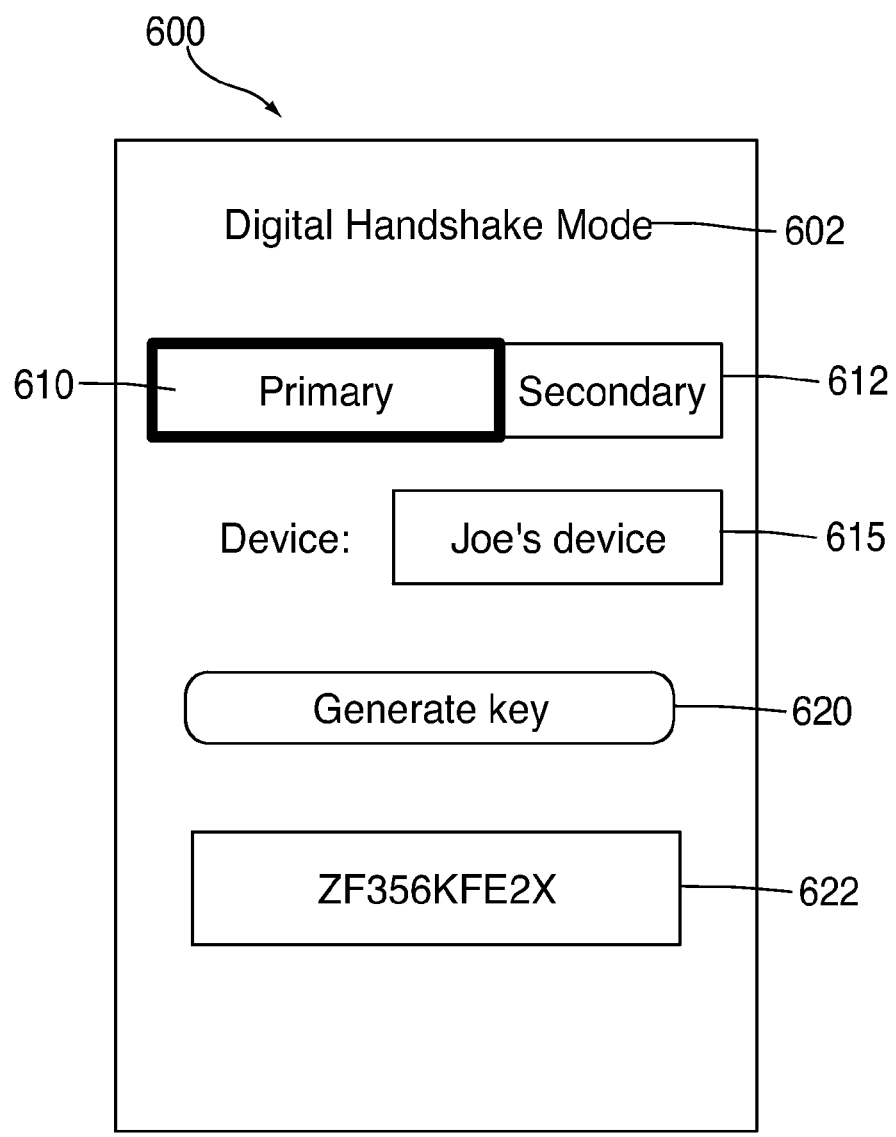
FIG. 6 is a schematic view of an illustrative display for enabling a handshake mode in accordance with one embodiment of the invention.

An electronic device can display a code or key for performing a digital handshake at any suitable time. In some embodiments, a user can enable a digital handshake mode. FIG. 6 is a schematic view of an illustrative display for enabling a handshake mode in accordance with one embodiment of the invention. Display 600 can include title 602 indicating the function of the display. A user can access display 600 using any suitable approach. For example, a user can access an application directed to creating a digital handshake (e.g., a communications application). As another example, a user can direct an application having a primary purpose to perform a digital handshake operation in addition to the primary purpose. In particular, while using an application, a user may wish to share information with another device. The user can then select an option related to performing a digital handshake, which can in turn direct the device to provide a display such as display 600.

Display 600 can include mode options 610 and 612. Options 610 and 612 can be used to determine the particular mode of each device over the communications path. In particular, options 610 and 612 can be used to define a primary, master or dominant device and a secondary or slave device. In some embodiments, options 610 and 612 can be tailored to a particular communications protocol. For example, options 610 and 612 can relate to a host/device pair. In some embodiments, options 610 and 612 can instead or in addition relate to access to information stored by the electronic device. For example, options 610 and 612 can define one or more folders or applications to which another electronic device will have access. As another example, the options can define specific file types or metadata tags corresponding to authorized or unauthorized data. In some embodiments, options 610 and 612 can define one or more passwords or secondary security systems (e.g., a biometric output) for providing access to secured information.

Display 600 can include device option 615 in which a user can provide identifying information for one or more devices with which to perform the digital handshake. A user can identify another device using any suitable approach, including for example by providing a public or broadcast identity (e.g., "Joe's device"). The user can enter the identity directly (e.g., using a keyboard), or can select a particular device from a list of detected devices. In some embodiments, a user can select a device that is not broadcasting an identity, but whose identity is known from a prior communications path (e.g., from a history of devices connected to the electronic device). In some embodiments, the device identity can include a user-entered code that the user received from the other device, where the user-entered code is used to authenticate the device before performing the digital handshake. This may be desirable, for example, to prevent a third device from capturing, at a distance, the key shown on display 600 and latching on to the communications path between the devices.

Using display 600, a user can generate a particular key for performing a digital handshake with another device. For example, a user can select option 620 for generating a key 622, which can be provided by display 600. The key can have any suitable form, including for example one or more of text, numbers, an image, video, audio, or an animation. In some embodiments, key 622 can be automatically generated without requiring a user input (e.g., automatically generate key 622 upon reaching display 600).

In some embodiments, key 622 can be the same at all times for an electronic device. When two devices perform a digital handshake, a common key constructed form the combination of the two static keys of the electronic devices can be used. Alternatively, only the key of the dominant or primary device can be used. In some embodiments, the key of one or both devices can instead or in addition be dynamic (e.g., only the primary device key, or only the secondary device key changes). For example, the key generated by a device can change each time the user requests a key to be generated (e.g., each time the user selects option 620). As another example, the key generated by the device can change based on a time out (e.g., the key changes automatically every minute). As still another example, the key can change based on the location of the device. By providing a dynamic key, an electronic device can ensure that a key is not re-used at a later time to access information stored on the device by performing the digital handshake (e.g., the key expires).

In some embodiments, a dynamic key can be generated from a static seed associated with each device. The seed can be user defined, or a default seed based on a unique device identifier. Any suitable process can be used to generate the dynamic key from the seed. In some embodiments, one or more of the options set by the user can be used in the process. For example, the mode of the device, the identity of the other device or devices participating in the handshake, the location of the devices, a time stamp, distance, a particular sensor output, or any other information that the device can extract can be used as part of the key generation process. In particular, the other information can be incorporated in a formula, along with the static seed.

The digital handshake can use the seeds or keys provided by one or both of the electronic devices. In some embodiments, the seed or key of only one of the devices can be used. For example, the key or seed corresponding to the primary device can be used. As another example, a key or seed corresponding a secondary device can be used. By placing the devices opposite one another and using a camera of the device not providing the key or seed, both devices can identify the key or seed. In particular, the device providing the key may be aware of the key, and the device capturing an image can extract the key from the image.

Once both devices have received a seed, the devices can perform a same operation on the seed to generate a key. For example, the devices can use same parameters in a process applied to the seed. The parameters can include, for example, parameters shown on the display of the device (e.g., a device name), time, location information, or any other parameter that is known to both devices. Using the generated key, the devices can initiate a secure communications path, or encode communications via the key using any suitable encryption protocol. Similarly, if the devices have both identified the key (e.g., from generating the key or from a captured image), the identified key can directly be used to initiate a secure communications path.

In some embodiments, the digital handshake can make use of the keys or seeds provided by each of the devices. In particular, each device can retrieve the key or seed that it generated and displayed, as well as extract, from a captured image, the key or seed corresponding to the other device. Each of the two devices can apply a same process for using both of the keys or seeds to generate a digital handshake key. In some embodiments, other parameters can be included in the process used to generate the digital handshake key, including for example time, location, device identifier, device mode, application, or other information. The other parameters can be retrieved using any suitable approach, including for example from the output of one or more sensors of the device, from information retrieved from a remote source (e.g., weather information corresponding to a location), or combinations of these.

In some embodiments, the electronic devices can select one of several different processes to apply to one or more seeds for generating a digital handshake key. For example, the electronic devices can select one of several processes based on the parameters selected by the users of the device (e.g., the parameters entered in a display such as display 600, FIG. 6). Alternatively, a user can select a particular process (e.g., select a process from a listing in display 600). If the two users select different processes, the electronic devices can use one of the processes (e.g., the one selected by the user of the primary device), both of the processes in sequence, or a different process having some features of each of the selected processes (e.g., a processing using parameters from both of the selected processes).

In some embodiments, the electronic devices can instead or in addition select a process based on the communications network used. For example, a subset of available processes may be available for each communications network (e.g., different processes for WiFi, 3G, and EDGE communications networks). In some embodiments, the particular process can be selected to generate a digital handshake key having particular properties determined from the capabilities of a communications network. For example, a process can output a key having specific attributes that correspond to a network bandwidth or transmission speeds (e.g., a shorter key for smaller transmissions over an EDGE network, and a longer key for more involved transmissions over a WiFi network). In some embodiments, the process can instead or in addition be selected based on an encryption method used for communications over the secure communications path.

In some embodiments, electronic devices can determine whether to generate a digital handshake key based on a dynamic key or seed, or on a static key or seed associated with an electronic device. In particular, a first electronic device can determine whether a second electronic device is viewing or can retrieve, from a captured image, a dynamic key or seed provided on a display of the first electronic device. For example, the first electronic device can determine whether a camera of the second device is oriented towards the display of the first device (e.g., whether the first device display is within the field of view of the second device camera). If the first electronic device determines that the second electronic device is oriented towards the display of the first device, the first electronic device can generate and display a dynamic key or seed, or use a previously displayed dynamic key or seed to generate the digital handshake key. Alternatively, if the first device determines that the second device camera cannot capture an image of the first device display, the first device can use a default or static seed or key embedded on the first device enclosure to generate a digital handshake key.

A first device can determine which region of the first device is visible to a second device using any suitable approach. In particular, the first device can use any approach to determine the field of view of a second device camera. In one implementation, one or more cameras of the first device can capture images of the device environment. The first device can process the captured images to detect a second device in the field of view, and to identify one or more cameras of the second device. Based on the orientation of the second device, and the position of the camera in the second device as shown in the captured images, the first device can extrapolate a field of view for the second device cameras, and determine which portion of the first device is in the field of view. The first device can then determine whether a dynamic key or seed, provided on the display, is in the field of view of a second device camera.

Figure 7:
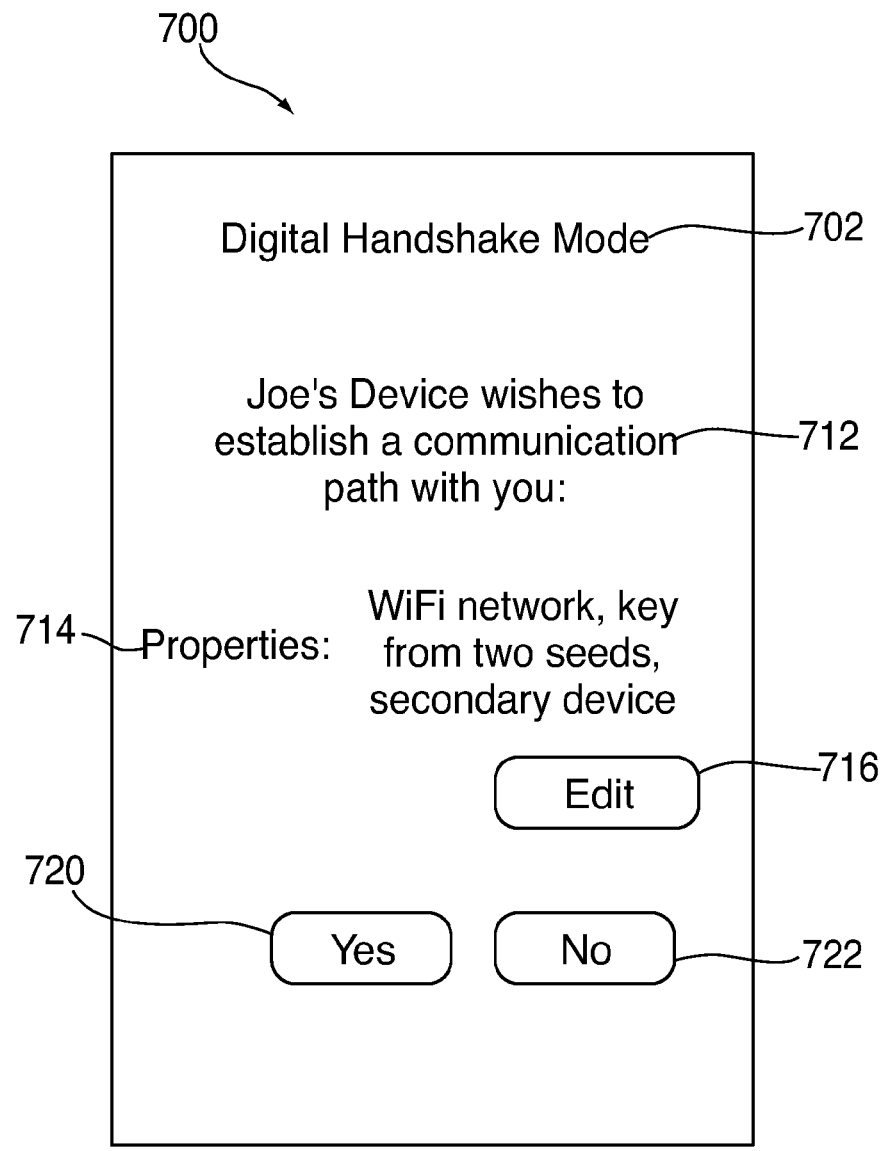
FIG. 7 is a schematic view of an illustrative display for confirming access to a communications path in accordance with one embodiment of the invention.

In some embodiments, an electronic device can prompt a user to confirm that the user wishes to establish or join a secure communications path. For example, the electronic device can prompt a user to confirm that a digital handshake initiated by another device was desired. In particular, the prompt may be desirable if a default seed or key, not shown on the device display (e.g., a seed embedded on the device enclosure) was used for the digital handshake. In some cases (e.g., when the user initiates the digital handshake, or when the electronic device provides a dynamic key or seed), the electronic device may not provide a confirmation display (e.g., the device may presume that the user wished to perform the digital handshake). FIG. 7 is a schematic view of an illustrative display for confirming access to a communications path in accordance with one embodiment of the invention. Display 700 can include title 702 indicating the context of display 700. Display 700 can include information 712 identifying the one or more devices wishing In some embodiments, display 700 can indicate properties 714 of the communications path. For example, properties 714 can include the type of network used for the communications path, the manner in which a digital handshake key was defined (e.g., how many and which seeds, the parameters of the protocol, or the type of protocol), a time out or maximum duration for the communications path, limitations on information transfers (e.g., bandwidth limitations of the communications path or the type of information that can be transferred), or any other attributes of the communications path. The user can elect to connect to the communications path by selecting option 720, or elect to reject the communications path by selecting option 722. In some embodiments, display 700 can include another option (e.g., option 716) for editing the properties of the network. In response to receive a selection of option 716, the electronic device can return to a display such as display 600 (FIG. 6), from which the user can redefine attributes or properties of the communications path.

In some embodiments, the first device can identify several other devices in images captured by one or more cameras of the first device. The first device can use any suitable approach to determine which of the identified other devices to analyze for performing the digital handshake. For example, the first device can select the identified device that is nearest to the first device (e.g., the device whose size is largest in a captured image). As another example, the first device can select an identified device based on the perceived orientation of the identified device (e.g., select a device that has a display facing a camera of the first device, or a portion of an enclosure that has an embedded key facing a camera of the first device). In some embodiments, the first device can select an identified device based on the ability of the first device to retrieve a key from the image of the second device. For example, the first device can select an identified second device having a display facing a camera of the first device.

In some embodiments, three or more devices can share a key or seed to create a secure communications path between the three or more devices. For example, a primary device can provide key or seed information (e.g., on a display) for the other devices. Alternatively, the three devices can generate a common digital handshake key from seeds or keys provided by two or more of the devices. In some cases, the key can be generated from one or more parameters commonly detected or identified by the different devices (e.g., a common location, time, or color scheme of the device environments).

The communications path can be created at any suitable time. In some embodiments, a path can initially be created between two devices, and additional devices can be added to the path (e.g., one of the initial two devices can provide the digital handshake key to the other devices). For example, two devices can create an initial communications path using a digital handshake key. To add another device to the path, one of the devices can display the digital handshake key in the field of view of a camera of the other device. In some embodiments, the digital handshake key can change each time a new device is added to the path. For example, the new key can be the result of a process applied to the key of the new device and the current digital handshake key. The new digital handshake key can be transmitted to all of the existing devices over the communications path, so that communications can be seamlessly switched to a new path secured by the new key.

Alternatively, a path can be simultaneously created between all of the electronic devices. In some embodiments, several devices can, in sequence, capture images of other devices and extract one or more seeds or keys from the images. For example, the electronic devices can be positioned in sequence such that each device can capture an image of one or two other devices. A first device can display an initial key, which a second device can detect. The second device can then display the initial key for a third device, which can repeat the key until it is captured by the final device. The devices can use the initial key, or apply a same process to the initial key to generate a digital handshake key. As another example, the electronic devices can alternatively sequentially identify a key associated with the prior devices in the sequence, and generate a dynamic key that incorporates some or all of the prior keys. The resulting digital handshake key generated by the last device can then incorporate attributes of all of the device key, and can be re-transmitted to all of the prior devices in the sequence to create the communications path. In some embodiments, the electronic devices can instead or in addition be positioned relative one another such that all of the devices can capture, using one or more cameras, images of the other devices. Using the one or more seeds, each device can generate the same digital handshake key and connect to the other devices over a communications path.

The secure communications path can be created over any suitable network. In some embodiments, the communications path can include a secure communications network. For example, an electronic device can create a secure communications network, where the digital handshake key is required to join the network (e.g., a WiFi network). In particular, a primary electronic device can broadcast a network ID and allow other devices having the secure key to join the network. In some embodiments, the communications path can instead or in addition include a specific path on an existing communications network. For example, the communications path can include a VPN, secure channel, or other limited access communications path (e.g., communications secured by SSH) provided over a public communications network that any device having appropriate circuitry can access (e.g., a cellular communications network). The communications path can use any suitable component of the communications network, including for example one or more cellular towers, routers, repeaters, or combinations of these.

Figure 8:
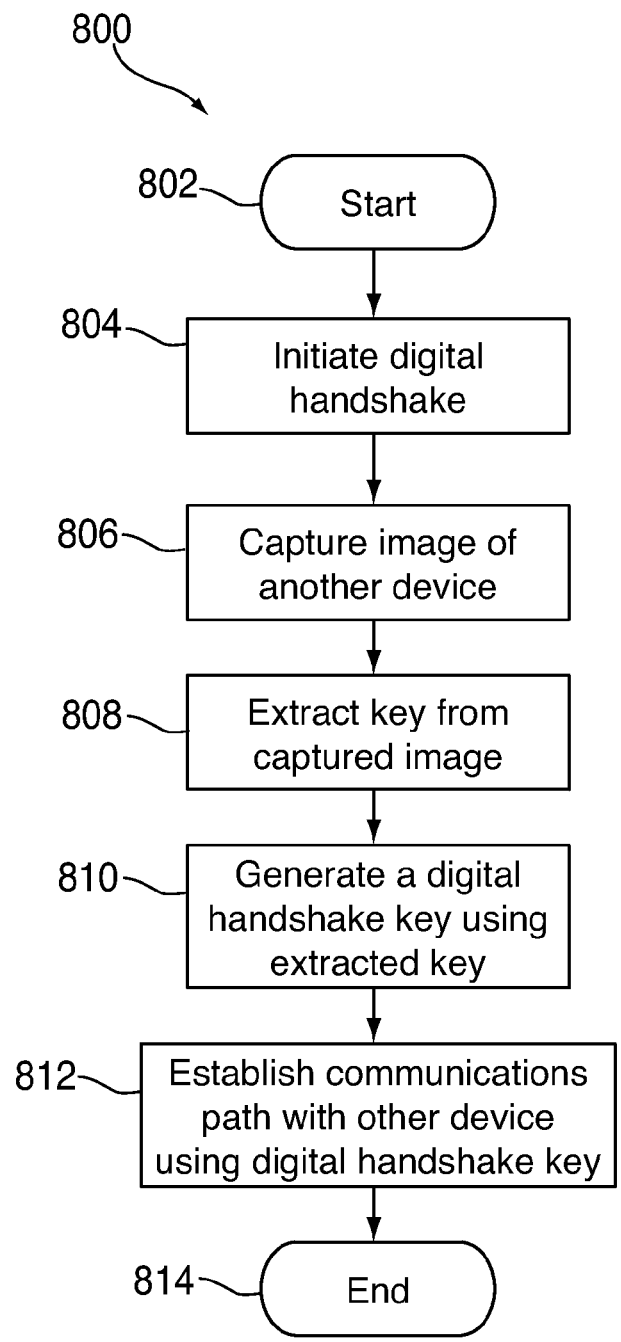
FIG. 8 is a flowchart of an illustrative process for performing a digital handshake between two devices in accordance with one embodiment of the invention.

FIG. 8 is a flowchart of an illustrative process for performing a digital handshake between two devices in accordance with one embodiment of the invention. Process 800 can begin at step 802. At step 804, the electronic device can initiate a digital handshake. For example, the electronic device can enable a digital handshake mode or application. As another example, the electronic device can select a digital handshake option within a running application. At step 806, the electronic device can capture an image of another device. For example, a camera of the electronic device can capture an image of the device environment, in which the other device is located. In some embodiments, a user can place two devices opposite one another such that camera of a first device can capture an image of the second device.

At step 808, the electronic device can extract a key form the captured image. For example, the electronic device can extract a static key or seed embedded on an enclosure of the second device. The static key or seed can have any suitable form, including for example a code, number, color sequence or pattern, image, or combination of these. In some cases, the key or seed can instead or in addition be provided on a display of the other electronic device. At step 810, a digital handshake key can be generated using the extracted key. For example, a process can be applied to the extracted key to generate the digital handshake key. As another example, the extracted key can serve as a digital handshake key. In some embodiments, the digital handshake key can be generated by applying a process to the extracted key and to a key originating from the electronic device. At step 812, a communications path can be established with the other device using the digital handshake key. For example, the digital handshake key can be used to establish a communications path over a secure protocol (e.g., https). As another example, the digital handshake key can be used to connect to a network (e.g., to establish a Bluetooth connection). Process 800 can then end at step 814.

Figure 9:
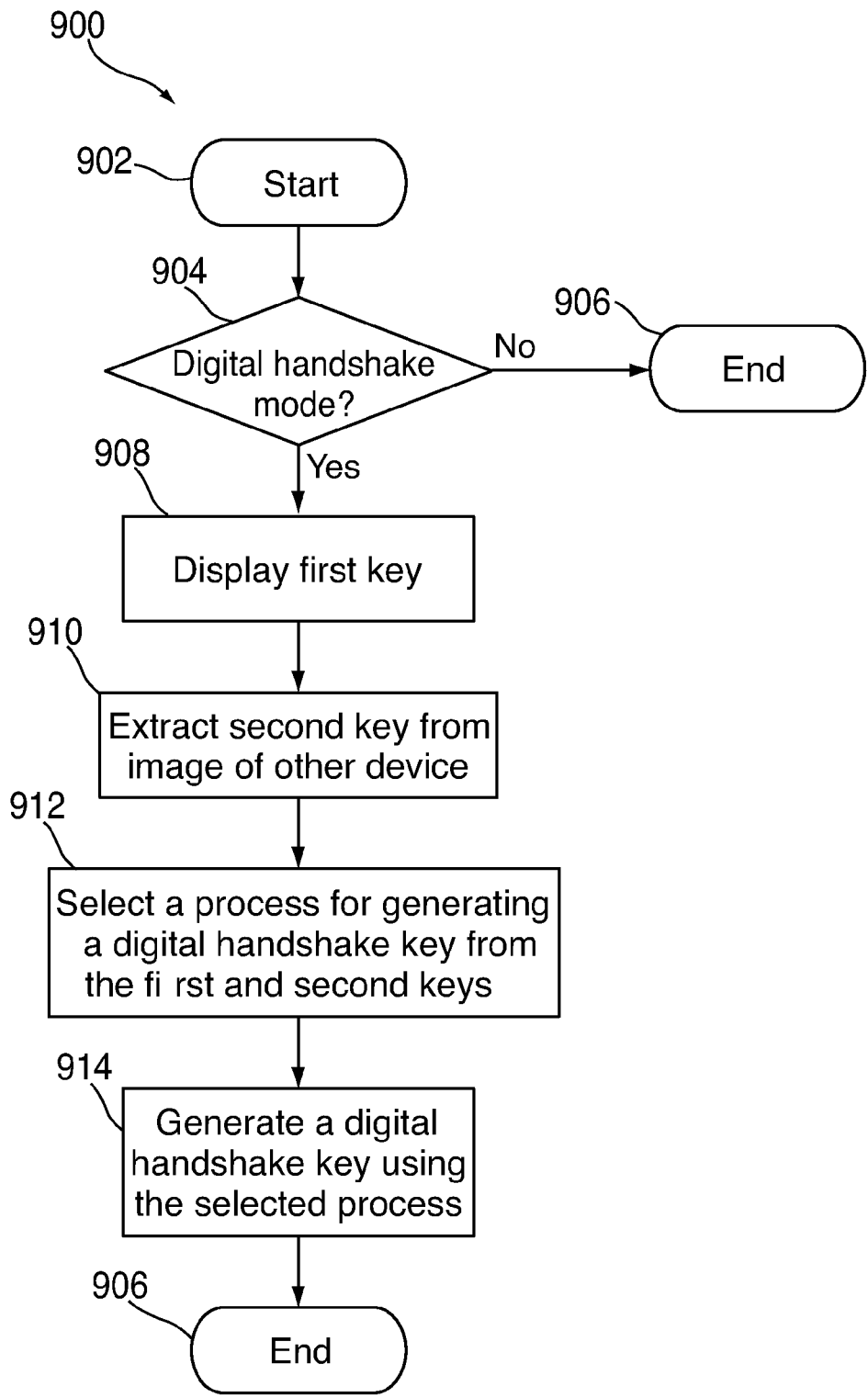
FIG. 9 is flowchart of an illustrative process for generating a digital handshake key in accordance with one embodiment of the invention.

FIG. 9 is flowchart of an illustrative process for generating a digital handshake key in accordance with one embodiment of the invention. Process 900 can begin at step 902. At step 904, the electronic device (e.g., a first device) can determine whether a digital handshake mode is enabled. For example, the electronic device can determine whether a digital handshake application is enabled. As another example, the electronic device can determine whether a digital handshake process provided as part of a different application was selected. If the electronic device determines that the digital handshake mode is not enabled, process 900 can move to step 906 and end.

If, at step 908, the electronic device instead determines that the digital handshake mode is enabled, process 900 can move to step 908. At step 908, the electronic device can display a first key or seed. For example, the electronic device can generate a dynamic (e.g., a random or seed-based) key and provide the key on the display. The key can have any suitable form, including for example one or more of the forms described above. At step 910, the electronic device can extract a second key from an image of another device (e.g., a second device). For example, the electronic device can use one or both of front and back facing cameras to capture images of the device environment, and analyze the captured images to determine the position of a second device in the images. The electronic device can extract the second key from any portion of the device captured in the image, including for example the device enclosure or the device display.

At step 912, the electronic device can select a process for generating a digital handshake key from the first and second devices. For example, the electronic device can select a set of parameters to include in the process. As another example, the electronic device can select from a list of available processes. In some cases, the electronic device can automatically select a process based on any suitable criteria, including the devices establishing the communications path, the type of communications network, processing capabilities of each device, available sensor outputs, user-provided parameters (e.g., on a display), or combinations of these. At step 914, a digital handshake key can be generated using the selected process. For example, a mathematical process can be used to generate a digital handshake key, where at least the first and second keys are used as arguments in the mathematical process. In some cases, the digital handshake key can include portions of one or both of the first and second keys (e.g., concatenate the two keys). Process 900 can then end at step 906.

Figure 10:
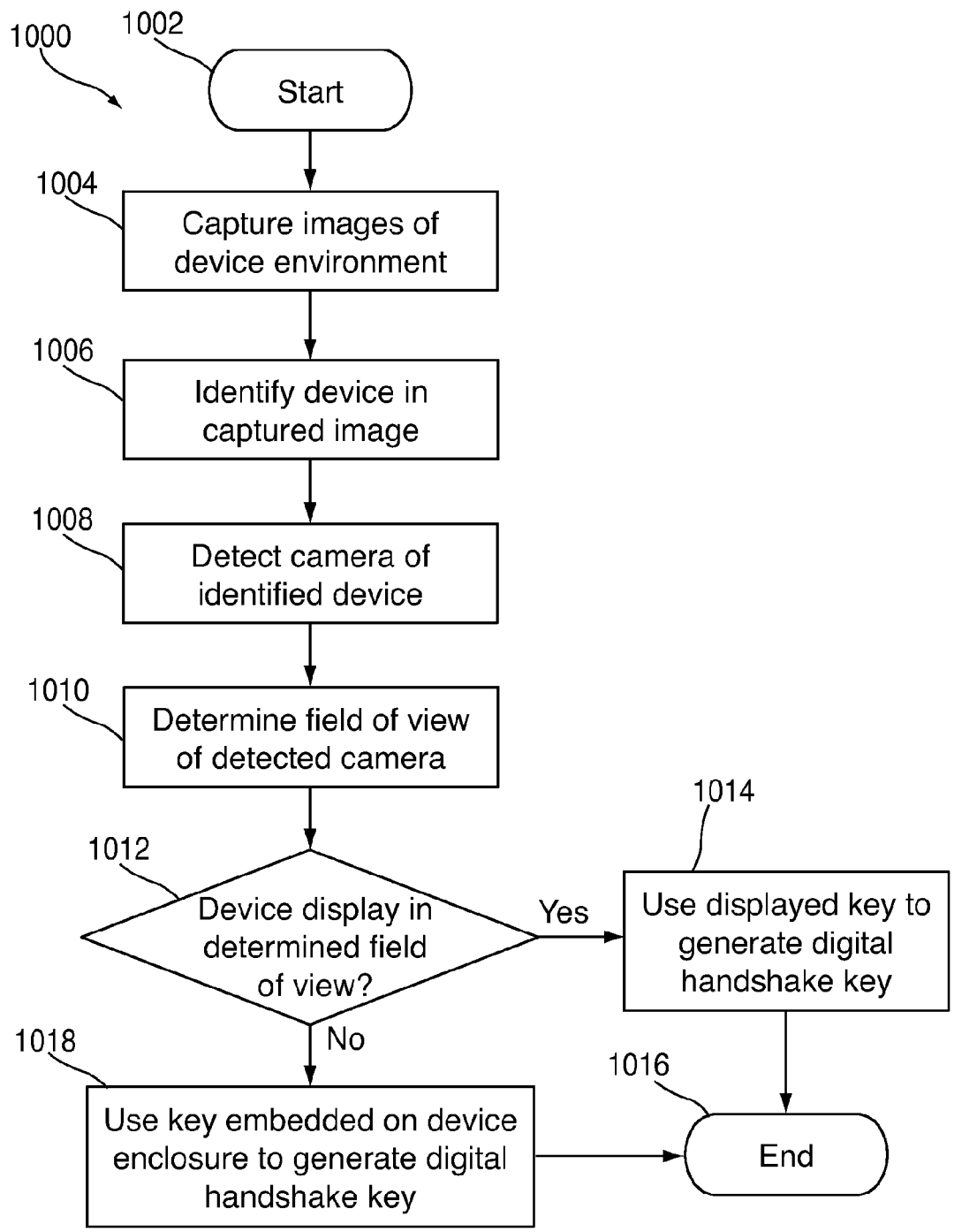
FIG. 10 is a flowchart of an illustrative process for determining which of several keys to use to generate a digital handshake key in accordance with one embodiment of the invention.

FIG. 10 is a flowchart of an illustrative process for determining which of several keys to use to generate a digital handshake key in accordance with one embodiment of the invention. Process 1000 can begin at step 1002. At step 1004, an electronic device can capture images of the device environment. For example, an electronic device can capture one or more images of the device environment using front facing and rear facing cameras. At step 1006, the electronic device can identify a device in a captured image. For example, the electronic device can detect a specific feature of a device (e.g., a particular shape corresponding to a device housing, or a shape corresponding to the relative position of buttons on a device). At step 1008, the electronic device can detect a camera in the identified device. For example, the electronic device can detect a lens on a captured image (e.g., from the manner in which light reflects from the lens).

At step 1010, the electronic device can determine the field of view of the identified camera. For example, the electronic device can determine the orientation of the camera from the position of the camera on the identified device, and from the orientation of the identified device in the captured image (e.g., based on the boundaries of the device). In some embodiments, the electronic device can identify a specific model for an identified device, and retrieve camera specifications for the specific model. At step 1012, the electronic device can determine whether its display is in the determined field of view of the detected camera. For example, the electronic device can determine which device camera captured the image of the other device (e.g., a front facing or a back facing camera), and whether the device camera is in the determined field of view. In some embodiments, the electronic device can determine the angle of the device display relative to the field of view (e.g., to determine whether information provided on the display will be legible or too distorted to be extracted by an image captured by the detected camera).

If, at step 1012, the electronic device determines that the device display is within the determined field of view, process 1000 can move to step 1014 and use a displayed key to generate a digital handshake key. For example, the electronic device can use a dynamic key or seed provided on the display to generate a digital handshake key. Process 1000 can then end at step 1016. If, at step 1012, the device determines that the device display is not within the determined field of view, process 1000 can move to step 1018. At step 1018, the electronic device can use a key embedded on the device enclosure to generate a digital handshake key. For example, the electronic device can use a static key or seed incorporated on the device housing, bezel or band to generate a digital handshake key. Process 1000 can then move to step 1016 and end.

Figure 11:
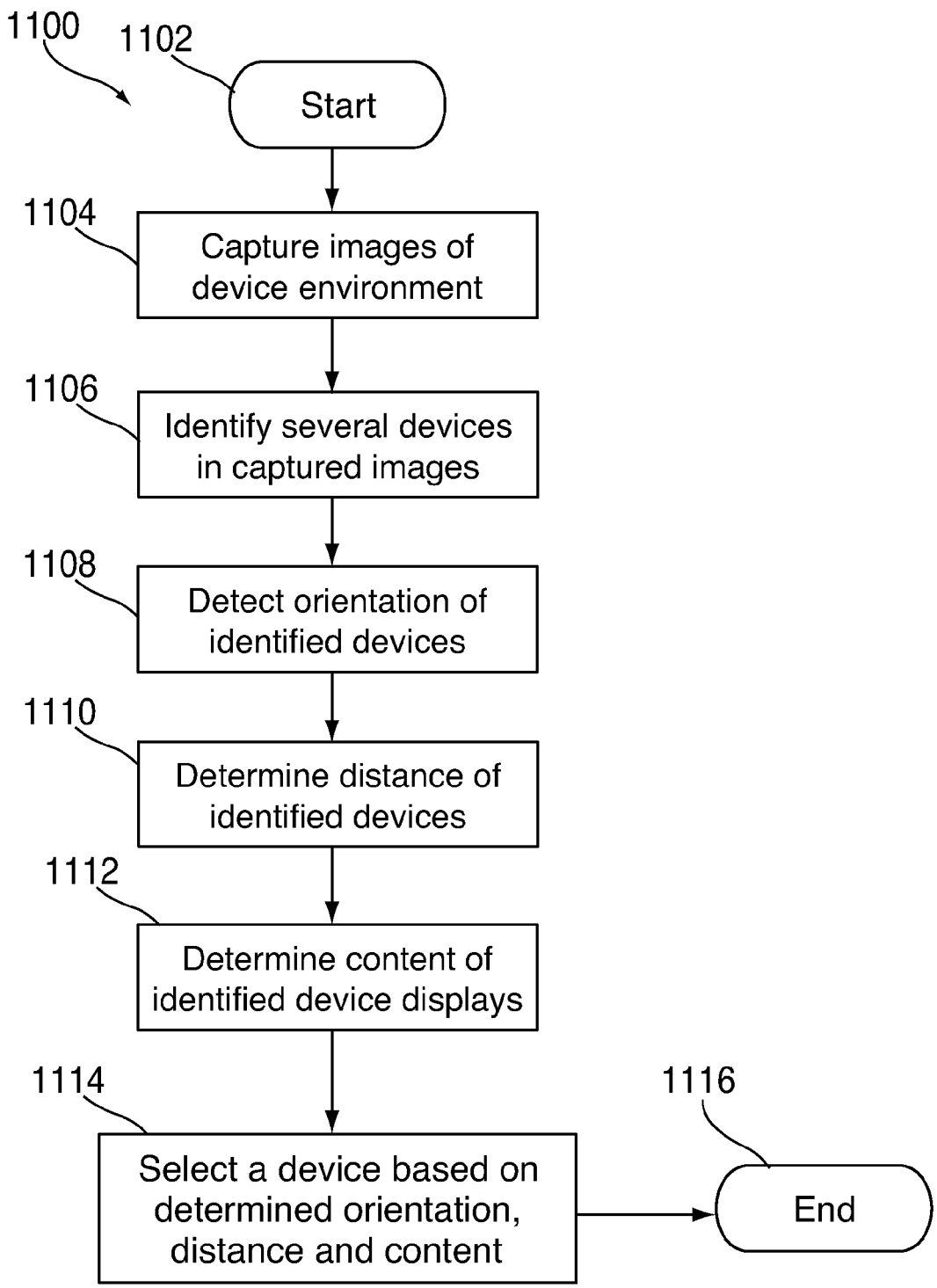
FIG. 11 is a flowchart of an illustrative process for selecting one of several devices identified in a captured image for performing a digital handshake in accordance with one embodiment of the invention.

FIG. 11 is a flowchart of an illustrative process for selecting one of several devices identified in a captured image for performing a digital handshake in accordance with one embodiment of the invention. Process 1100 can begin at step 1102. At step 1104, an electronic device can capture images of the device environment. For example, an electronic device can use front and back facing cameras to capture images of a device environment. At step 1106, the electronic device can identify several devices in the captured images. For example, the electronic device can detect several devices from patterns, shapes, or colors in the captured images.

At step 1108, the electronic device can determine the orientation of the identified devices relative to the device. For example, the electronic device can determine whether the identified devices are facing towards or away from the device. As another example, the electronic device can determine whether a camera of the other devices can capture an image of the device. At step 1110, the electronic device can determine the distance of the identified devices from the device. For example, the electronic device can determine the relative size of the identified devices in the images captured by the device camera. At step 1112, the electronic device can determine the content of the displays of the identified displays. For example, the electronic device can determine whether one or more of the identified devices have a display corresponding to a digital handshake mode.

At step 1114, the electronic device can select one or more devices based on the determined orientation, distance, and displayed content. For example, the electronic device can select a device showing a digital handshake mode display. As another example, the electronic device can select the device positioned front-to-front (e.g., display-to-display) with the electronic device. As still another example, the electronic device can select a device that is nearest to the electronic device. Process 1100 can then end at step 1116.

Figure 12:
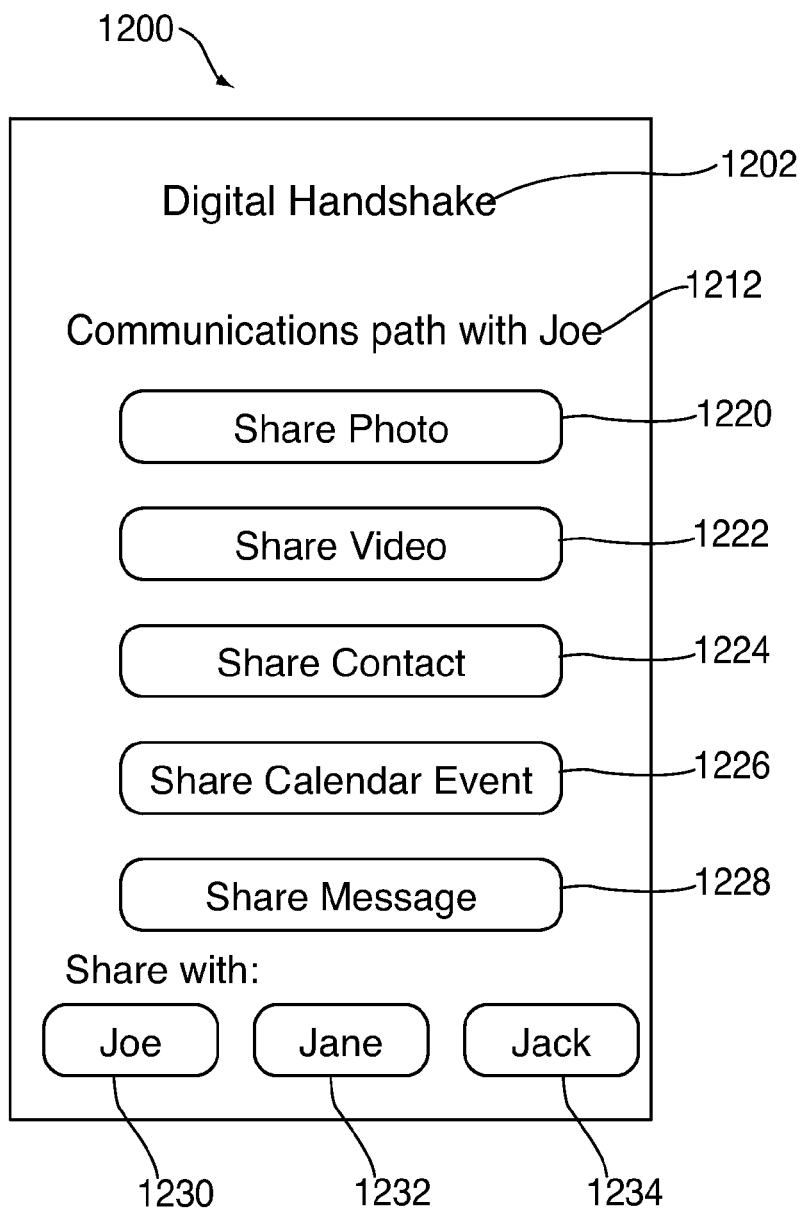
FIG. 12 is a schematic view of an illustrative display of a digital handshake application in accordance with one embodiment of the invention.

Using the digital handshake, electronic devices can share any different information. In some embodiments, an electronic device can share information independent of a particular application operated by the device. For example, a user can establish a communications path using the digital handshake using a digital handshake application, and share information from the digital handshake application. FIG. 12 is a schematic view of an illustrative display of a digital handshake application in accordance with one embodiment of the invention. Display 1200 can include title 1202 with information 1212 indicating properties of a communications path used by the device. For example, information 1212 can include attributes of the communications path (e.g., bandwidth, security level, or network speed), the other devices on the communications path (e.g., with which the device can communicate), or combinations of these.

Using display 1200, a user can transmit any suitable type of information to another device. For example, a user can select option 1220 to share a photo, option 1222 to share a video, option 1224 to share a contact, option 1226 to share a calendar event, and option 1228 to share a message (e.g., text, media or email message). In response to receiving a selection of one of the options, the electronic device can prompt the user to select one or more instances of the selected information (e.g., one or more photos). For example, the electronic device can retrieve a catalog of corresponding information from which the user may select one or more instances. As another example, the electronic device can switch to an application providing the information, and following the user selection, return to the handshake application.

In some embodiments, an electronic device can be connected to several devices using the communications path. For example, the electronic device can be connected to devices used by Joe, Jane and Jack. The user can select which of the other devices to which to transmit information using any suitable approach, including for example by selecting one or more of options 1230, 1232 and 1234 corresponding to each of the connected devices. In some embodiments, the display 1200 can instead or in addition include a listing of available devices (e.g., in a menu or drop-down), or an option for searching for specific connected devices. Alternatively, a user can enter a name or address for a specific device that is expected to be connected to the communications path.

Figure 13A:
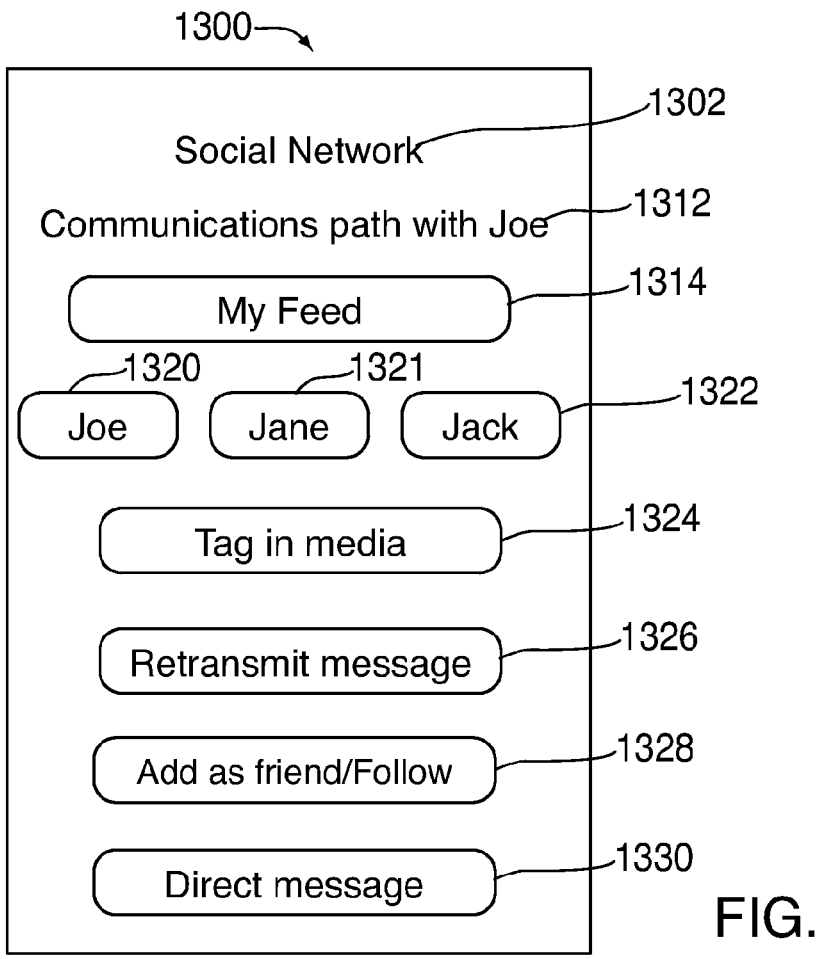
FIG. 13A is a schematic view of an illustrative display using any suitable application to share information for a social network application in accordance with one embodiment of the invention.
Figure 13B:
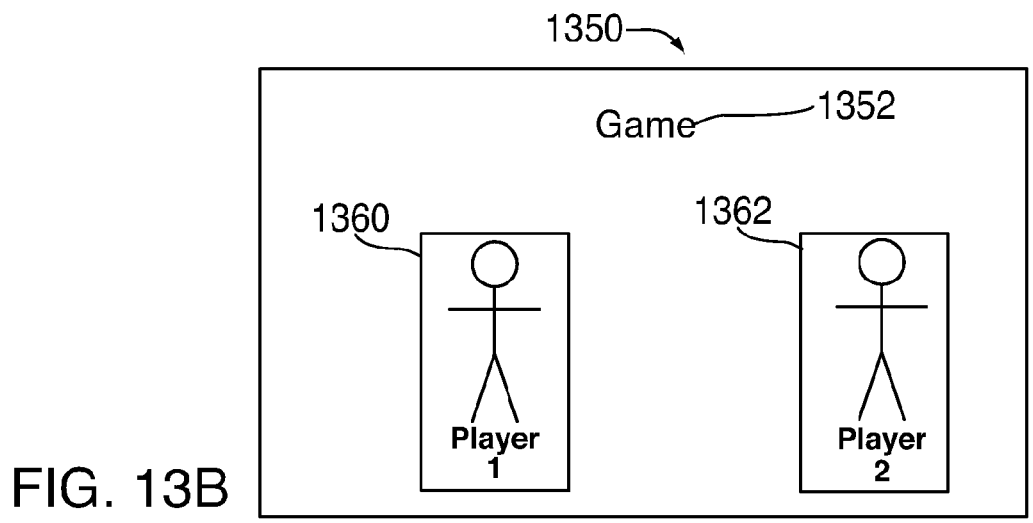
FIG. 13B is a schematic view of an illustrative display using any suitable application to share information for a game in accordance with one embodiment of the invention.

In some embodiments, a user can instead or in addition share information within the context of an application. For example, a user can share social networking information in a social network application. As another example, a user can share gaming information while playing a game on the device. FIGS. 13A and 13B are schematic views of illustrative displays corresponding to applications that can be used to share information over a communications path established by a digital handshake in accordance with one embodiment of the invention. The electronic device can use any suitable application to share information, including for example a social network application (as shown in FIG. 13A) or a game (as show in FIG. 13B). Display 1300 can include title 1302 indicating that the display corresponds to a social network. Title 1302 can identify a particular social network service (e.g., Twitter, Loopt, or 4square), or a particular type of social network service (e.g., micro-blogging). Display 1300 can include information 1312 indicating the one or more devices or users with which a communications path is available. In some embodiments, information 1312 can scroll or be provided dynamically to identify specific devices (or groups of devices or users).

In some embodiments, display 1300 can include one or more options for performing social network operations that do not relate to the communications path. For example, display 1300 can include option 1314 to access a general feed corresponding to the user, or corresponding to a page, wall or other set of content. In some embodiments, the electronic device can display a generic or user-specific social network display (e.g., a standard display provided in response to accessing a social network application) in response to receiving a user selection option 1314.

Display 1300 can include one or more options for performing a social network application operations that take advantage of the communications path and the identification of the user's device and of the other devices on the communications path. In some embodiments, a user can first select one or more devices with which to perform the operations. For example, display 1300 can include options 1320, 1321 and 1322 corresponding to different users or devices available on the communications path. In some embodiments, display 1300 can include a dynamic listing or menu of other users or devices with which a communications path is available. The user can direct the electronic device to perform any suitable process related to a select user or device. For example, a user can select tag option 1324 to tag a particular media item or other information of a social network feed with the identity of the user selected in one of options 1320, 1321 and 1322. As another example, a user can select option 1326 to retransmit a message (e.g., repeat a post by the identified user), or select option 1328 to add a user as a friend, or to follow micro-blog or blog posts of the identified user or device. As still another example, display 1300 can include option 1330 for providing a direct message to an identified user or device (e.g., a direct message within the social network).

Display 1350 can include title 1352 indicating that it is a game display. In some embodiments, display 1300 can include a background or options corresponding to a game played by the user. Using a communications network, the electronic device can identify one or more other users or devices connected to the electronic device and available for playing a multiplayer game with the user. The user can select one or more other devices or users with whom to play using any suitable approach, including for example by selecting one or more of options 1360 and 1362, each associated with a different user. In some embodiments, display 1350 can include an indication that another user requested to play with the user of the electronic device, and prompt the user to accept or reject the invitation. Once two or more users have agreed to play over the communications path, the game, operating on one or both devices (e.g., streaming to another device, or running independently on each device) can coordinate the inputs or game play by each of the users.

Using a secure communications path established as described above, an electronic device can share any suitable type of information. In some embodiments, an electronic device can share copies of documents or other information stored by the device. For example, an electronic device can share media (e.g., photos, audio, Or video), e-books, text content, web browsing history, contact information, calendar events, other application data, or combinations of these. The shared information can be provided as links to the user's device (e.g., streaming information) or as copies of the information. In some embodiments, access to some shared information may be restricted unless all users have purchased access (e.g., acquired a license) for the information.

In some embodiments, an electronic device can share information regarding the user's consumption of information instead of or in addition to the information itself. For example, an electronic device can share a media playback position, a reading location for an e-book, a current photo reviewed in an album, or combinations of these. By sharing a playback position or other information consumption position, several users can synchronize their information consumption to be able to share or talk about the same information at the same time. This approach may also allow the users to more easily help each other, as each will know what the others are reading, reviewing, considering, or thinking about.

In some embodiments, a digital handshake can be used to share some or all of a display provided by an electronic device. For example, a screen or window sharing process can be implemented over the digital handshake protocol. For example, a first device can transmit, over communications circuitry, some or all of the display generated by the device. In particular, the first device can retrieve the information provided to display circuitry of the device, and route the information to another device for display. In some cases, the information can change dynamically such that the other device can monitor and see the display of the initial device as it changes.

In some embodiments, an electronic device can instead or in addition capture an image corresponding to a display at a particular moment in time, and transmit the image to one or more other devices. A user can limit the image to a particular portion of the device display, including for example one or more windows or menus, application displays (e.g., if several applications are displayed simultaneously), a region selected by the user (e.g., a user can draw one or more closed regions on the display), or specific content having particular attributes (e.g., share a slide, but not the displayed notes accompanying the slide.

In some embodiments, the handshake protocol can be used as part of an authentication process for a user. In particular, the key or seed embedded on a device housing, or displayed by the electronic device can be unique and associated with a specific user. When a device uses the handshake protocol, not only may a secure communications path be established, but the specific device with which the communications path is established can also be identified and authenticated.

Figure 14:
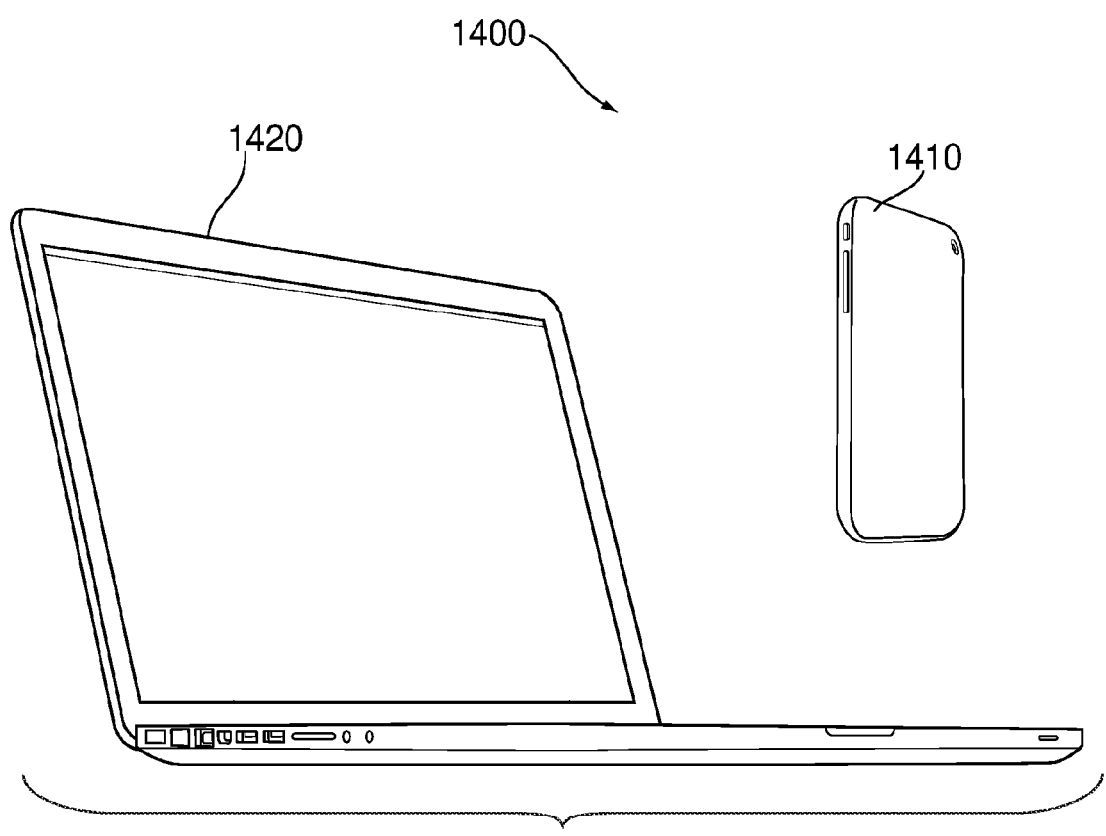
FIG. 14 is a schematic view of an illustrative device system for authenticating using a handshake protocol in accordance with one embodiment of the invention.

In one implementation, a handshake protocol can be used to log into a second device (e.g., a desktop or notebook computer) from a first device (e.g., a portable device or cellular telephone). More generally, the first device can be used to release information available from a second device. FIG. 14 is a schematic view of an illustrative device system for authenticating using a handshake protocol in accordance with one embodiment of the invention. System 1400 can include first device 1410 and second device 1420. For example, device 1410 can include a portable device carried by the user (e.g., a pocket) such as a portable media player, a cellular telephone, a mobile communications device, or any other electronic device. Device 1420 can include any suitable electronic device, including for example a notebook or desktop computer, a terminal, a portable device, a media player (e.g., Apple TV, available from Apple Inc.), or any other electronic device that can be used by a user. In some embodiments, device 1420 can be connected to one or more peripheral devices, such as a printer (e.g., for printing tickets). Each of devices 1410 and 1420 can include a camera to perform a digital handshake as described above.

In some embodiments, device 1420 can be associated with a third party or a service that the user of device 1410 wishes to use. For example, device 1420 can be associated with a store from which the user can make purchases (e.g., purchase goods or access to a location or good), a service provider (e.g., a doctor or an accountant) from which a user can purchase services, an agency (e.g., a government agency providing IDs or other user-specific privileges), or combinations of these. In one implementation, device 1420 can be associated with a pharmacy in communication with a doctor's office. A doctor can transmit a prescription for a user to the pharmacy for pickup, where the prescription information is associated with identifying information for the user. In one implementation, the identifying information can include a key or seed associated with a device (e.g., device 1410) of the user, where the seed or key is used in a digital handshake process. When the user goes to the pharmacy to pick up the prescribed medicine, device 1420 of the pharmacy can authenticate the user's device 1410 by creating a secure communications path between the devices using the digital handshake protocol, and retrieve the medicine associated with the user. In some embodiments, the use of the digital handshake can serve as a signature for the user of device 1410 (e.g., an e-signature).

Figure 15:
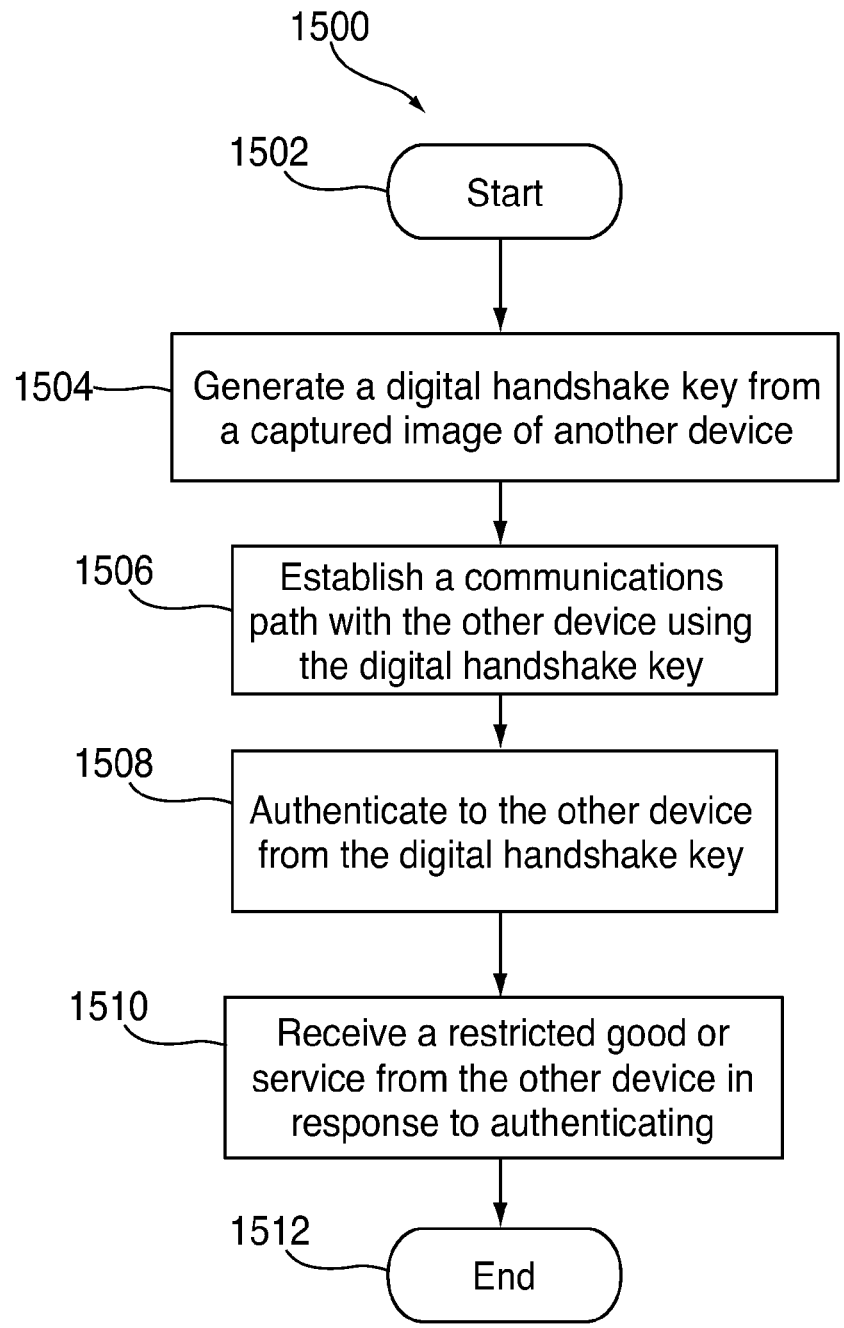
FIG. 15 is a flowchart of an illustrative process for authenticating to another device using a digital handshake protocol in accordance with one embodiment of the invention.

FIG. 15 is a flowchart of an illustrative process for authenticating to another device using a digital handshake protocol in accordance with one embodiment of the invention. Process 1500 can begin at step 1502. At step 1504, an electronic device can generate a digital handshake key from a captured image of another device. For example, an electronic device can capture an image of the display of another electronic device. The electronic device can extract a key or seed from the captured image, and generate a digital handshake key from the extracted key. At step 1506, the electronic device can establish a secure communications path with the other device using the digital handshake key. For example, the electronic device and the other device can use the digital handshake key as an encryption key for communications over the communications path. As another example, the digital handshake key can be used to initiate the communications protocol.

At step 1508, the electronic device can authenticate to the other device using the digital handshake key. For example, the other device can identify a user of the electronic device from a specific digital handshake key used to establish the communications path. At step 1510, the electronic device can receive a good or service from the other electronic device in response to authenticating. For example, the other electronic device can provide a license to requested information, or authorization to receive a good (e.g., medicine) in response to authenticating the user. Process 1500 can then end at step 1512.

Figure 16:
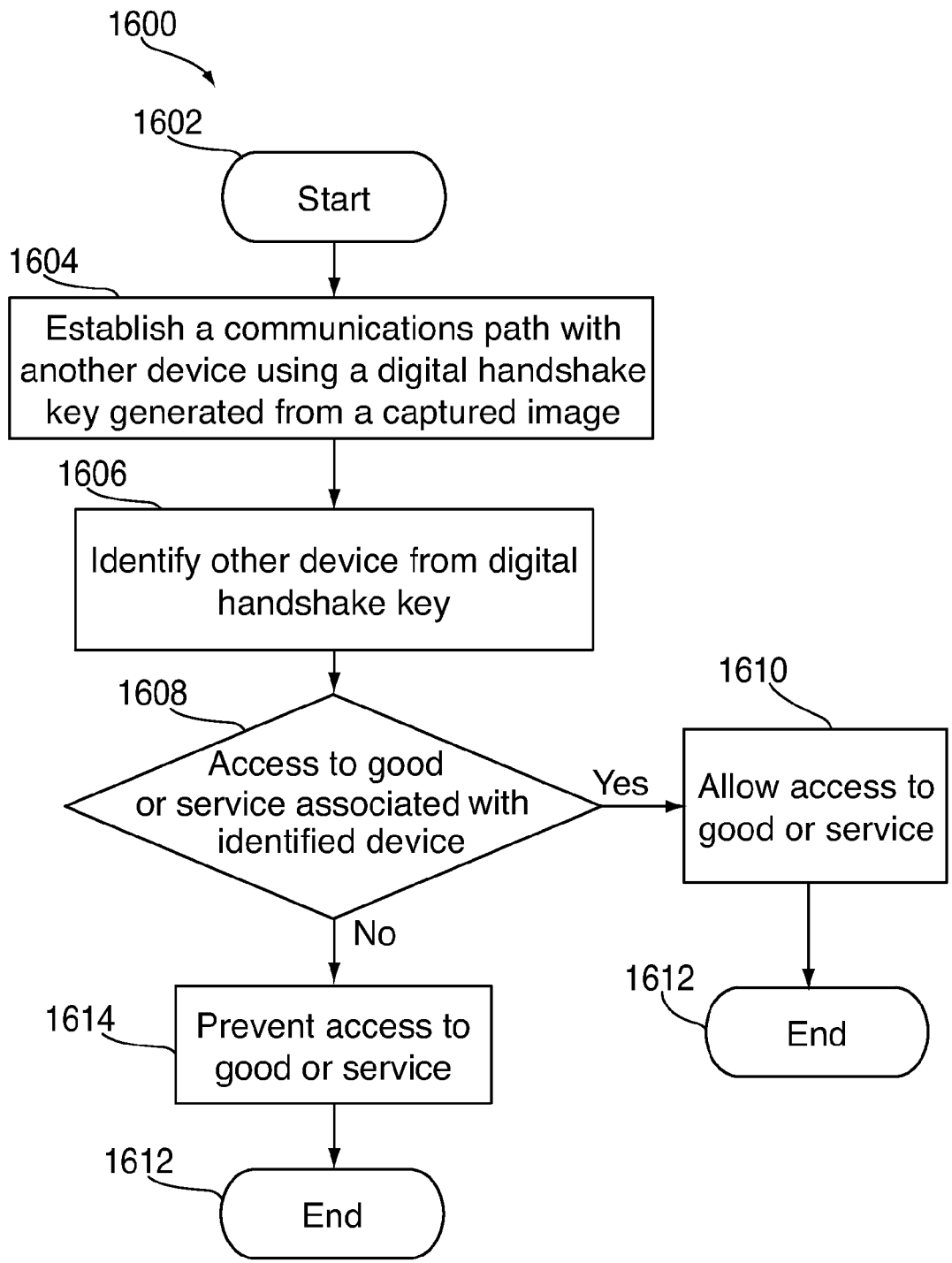
FIG. 16 is a flowchart of an illustrative process for providing restricted access to a user in response to authenticating the user via a digital handshake in accordance with one embodiment of the invention.

FIG. 16 is a flowchart of an illustrative process for providing restricted access to a user in response to authenticating the user via a digital handshake in accordance with one embodiment of the invention. Process 1600 can begin at step 1602. At step 1604, a communications path can be established with another device using a digital handshake key generated from a captured device. For example, two devices can generate a common digital handshake key based on images of the other device captured by each of the two devices. A key or seed can be extracted from the images, where the key or seed is uniquely associated with a particular device or user. At step 1606, a device can identify the other device from the digital handshake key. For example, a device can determine, from the digital handshake key, the identity of the user or other device providing a seed or key used to generate the digital handshake key.

At step 1608, the electronic device can determine whether access to a good or service (or information) provided by the device is associated with the identified other device. For example, the electronic device can determine whether a good, service or information requested by the other device is access restricted, and whether access is available to the other device. As another example, the electronic device can determine whether it controls access to information that is associated with the identified user. If the electronic device determines that access to information associated with the identified device is available, process 1600 can move to step 1610. At step 1610, the electronic device can allow or provide access to the good or service to the other device. For example, the electronic device can transmit the good or service to the other device. As another example, a user of the electronic device can retrieve a particular good, or perform a particular service for the user of the other device. Process 1600 can then end at step 1612.

If, at step 1608, the electronic device instead determines that access to information associated with the identified device is not available, process 1600 can move to step 1604. At step 1604, the electronic device can deny or prevent access to the goods or services. For example, the electronic device can instruct the other device to purchase or request access to the goods or services, at which point process 1600 could return to step 1606. Process 1600 can then end at step 1602.

Although many of the embodiments of the present invention are described herein with respect to personal computing devices, it should be understood that the present invention is not limited to personal computing applications, but is generally applicable to other applications.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above described embodiments of the invention are presented for purposes of illustration and not of limitation.

What is claimed is:

1. A method for authenticating a first device using a second device, comprising:
   at the second device:
   capturing, by a camera of the second device, a first image displayed at the first device, the first image corresponding to a first value stored on the first device;
   extracting the first value from the first image;
   displaying, at a display of the second device, a second image corresponding to a second value that is based on the first value extracted from the first image;
   receiving a handshake key from the first device, wherein the handshake key is based on the first value and the second value, and the second value is extracted from the second image by the first device; and
   establishing a connection with the first device using the handshake key.

2. The method of claim 1, further comprising:
   determining whether a camera of the first device is oriented toward the second device.

3. The method of claim 2, wherein determining whether the camera of the first device is oriented toward the second device includes determining a field of view of the camera of the second device.

4. The method of claim 1, wherein the second value is generated by the second device in response to determining the camera of the first device is oriented toward the second device.

5. The method of claim 1, wherein the first value is extracted from the first image using a time dependent algorithm.

6. The method of claim 1, further comprising:
   authenticating the first device based on the handshake key.

7. The method of claim 1, further comprising: receiving, from a third device, an authorization to release an asset managed by the second device.

8. The method of claim 1, wherein the connection is established in response to receiving, from the first device, a request to access the asset.

9. The method of claim 1, wherein the first device includes a social networking application, and the method further comprises interacting with the first device via a social network associated with the social networking application.

10. A first electronic device for authenticating with a service provider, the first electronic device comprising:
    a display;
    a processor; and
    a memory storing instructions that when executed by the processor cause the first electronic device to perform the steps of:
    displaying, at the display, a first image corresponding to a first value stored on the first electronic device, wherein the image is detected by a second electronic device that is associated with a service provider;
    capturing a second image generated by the second electronic device and corresponding to a second value, wherein the second value is based on the first value extracted from the first image by the second electronic device;
    extracting the second value from the second image;
    generating a handshake key using the stored first value and the extracted second value; and
    establishing a connection with the second electronic device using the handshake key.

11. The first electronic device of claim 10, wherein the steps further include:
    authenticating with the second electronic device based on the second value.

12. The first electronic device of claim 11, wherein the second value is uniquely associated with and displayed by the first electronic device.

13. The first electronic device of claim 10, wherein the steps further include:
    determining whether a camera of the second electronic device is oriented toward the display of the first electronic device.

14. The first electronic device of claim 13, wherein the first image is displayed in response to determining that the camera of the second electronic device is oriented toward the display of the first electronic device.

15. The first electronic device of claim 14, wherein determining whether the camera of the second electronic device is oriented toward the first electronic device includes determining a field of view of the camera of the second electronic device.

16. A machine-readable non-transitory storage medium storing instructions that, when executed by a processor included in a first device having a display, cause the first device to carry out steps that include:
    displaying, at the display, a first image corresponding to a first value stored on the first device, wherein the image is detected by a second device that is associated with a service provider;
    capturing a second image generated by the second device and corresponding to a second value, wherein the second value is based on the first value extracted from the first image by the second device;
    extracting the second value from the second image;
    generating a handshake key using the stored first value and the extracted second value; and
    establishing a connection with the second device using the handshake key.

17. The machine-readable non-transitory storage medium of claim 16, wherein the first device is associated with a store selling goods.

18. The machine-readable non-transitory storage medium of claim 17, wherein the second device includes a social networking application and the first device communicates with the second device via a social network associated with the social networking application.

19. The machine-readable non-transitory storage medium of claim 16, wherein the steps further include:
    determining whether a camera of the second device is oriented toward the display of the first device.

20. The machine-readable non-transitory storage medium of claim 19, wherein the first image is displayed in response to determining the camera of the first device is oriented toward the display of the second device.

* * * * *